(12) United States Patent
Coomber et al.

(10) Patent No.: US 9,438,503 B2
(45) Date of Patent: Sep. 6, 2016

(54) NETWORK SERVICES TESTING WITH PLUGGABLE TRANSCEIVERS

(71) Applicant: JDS Uniphase Corporation, Milpitas, CA (US)

(72) Inventors: David George Coomber, Nepean (CA); Emmanuelle Marie Josèphe Janz, Dunrobin (CA); Jason Curry, Raleigh, NC (US)

(73) Assignee: VIAVI SOLUTIONS INC., Milpitas, CA (US)

( * ) Notice: Subject to any disclaimer, the term of this patent is extended or adjusted under 35 U.S.C. 154(b) by 150 days.

(21) Appl. No.: 14/031,901

(22) Filed: Sep. 19, 2013

(65) Prior Publication Data

US 2014/0016479 A1 Jan. 16, 2014

Related U.S. Application Data

(63) Continuation-in-part of application No. 13/783,871, filed on Mar. 4, 2013, now Pat. No. 9,118,601.

(60) Provisional application No. 61/702,818, filed on Sep. 19, 2012, provisional application No. 61/606,800, filed on Mar. 5, 2012.

(51) Int. Cl.
*H04L 12/26* (2006.01)
*H04L 12/40* (2006.01)
*H04L 12/413* (2006.01)

(52) U.S. Cl.
CPC ......... *H04L 43/50* (2013.01); *H04L 12/40013* (2013.01); *H04L 12/413* (2013.01); *H04L 43/06* (2013.01)

(58) Field of Classification Search
None
See application file for complete search history.

(56) References Cited

U.S. PATENT DOCUMENTS

| | | | |
|---|---|---|---|
| 5,010,544 A | 4/1991 | Chang et al. | 370/13.1 |
| 5,343,461 A | 8/1994 | Barton et al. | 370/13 |
| 5,365,485 A | 11/1994 | Ward et al. | |
| 5,784,558 A | 7/1998 | Emerson et al. | |
| 5,838,900 A | 11/1998 | Horvath et al. | |
| 6,477,674 B1 | 11/2002 | Bates et al. | |
| 7,868,780 B2 | 1/2011 | Engel et al. | 340/870.07 |
| 8,139,494 B2 | 3/2012 | Robitaille et al. | 370/241 |

(Continued)

FOREIGN PATENT DOCUMENTS

WO  2008/041978  4/2008 ............. G06F 15/78

OTHER PUBLICATIONS

PCT/US2013/60733 Search Report dated Feb. 5, 2014.
(Continued)

*Primary Examiner* — Noel Beharry
*Assistant Examiner* — Wilfred Thomas
(74) *Attorney, Agent, or Firm* — Mannava & Kang, P.C.

(57) ABSTRACT

The disclosure relates to test-capable pluggable transceivers and network systems and methods using such transceivers. A central test server generates a test request and communicates to a mediation sub-system, which uses a common management protocol to communicate with a plurality of transceivers in the network. The mediation sub-system translates the test request into sub-tests and generates sequences of test-control commands for executing by specific transceivers to configure test logic deployed within the transceivers for testing designated network services, to generate test frames, and/or to process received frames to collect test results.

24 Claims, 19 Drawing Sheets

(56) References Cited

U.S. PATENT DOCUMENTS

| | | | |
|---|---|---|---|
| 8,345,703 | B2 | 1/2013 | Heinkel et al. ............... 370/419 |
| 8,649,271 | B2* | 2/2014 | Jackson ........................ 370/241 |
| 2004/0030857 | A1* | 2/2004 | Krakirian et al. ............ 711/206 |
| 2005/0050189 | A1* | 3/2005 | Yang .............................. 709/223 |
| 2008/0159737 | A1 | 7/2008 | Noble et al. |
| 2009/0073887 | A1 | 3/2009 | Robitaille et al. ........... 370/248 |
| 2009/0109973 | A1 | 4/2009 | Ilnicki .......................... 370/392 |
| 2009/0154918 | A1* | 6/2009 | Hinderthuer et al. ............ 398/9 |
| 2011/0019584 | A1* | 1/2011 | Raghavendran et al. .... 370/254 |
| 2011/0182191 | A1 | 7/2011 | Jackson |
| 2011/0194425 | A1 | 8/2011 | Li et al. |
| 2011/0283140 | A1* | 11/2011 | Stevens et al. ................. 714/27 |
| 2012/0051233 | A1 | 3/2012 | Robitaille et al. ........... 370/248 |
| 2012/0170465 | A1 | 7/2012 | Spieser et al. ................ 370/249 |
| 2012/0182900 | A1 | 7/2012 | Davari .......................... 370/254 |
| 2012/0301134 | A1 | 11/2012 | Davari et al. ..................... 398/9 |
| 2013/0229927 | A1 | 9/2013 | Chouinard et al. |

OTHER PUBLICATIONS

Accedian Networks, White Paper: Accedian EtherNID™ and JDSU QT-600, Version 1.5 by Damien Ramé, Accedian Networks Inc, May 18, 2007.

"Smart SFP™ simplifies operations and maintenance for network operators" OE Solutions & AimValley Feb. 28, 2012.

"AN 603: Active Serial Remote System Upgrade Reference Design" ALTERA Apr. 2010.

"Cyclone V Device Handbook vol. 1: Device Overview and Datasheet" ALTERA Feb. 2012.

"8. Configuration and Remote system Upgrades in Cyclone IV Devices" ALTERA Nov. 2011.

"White Paper: Accedian EtherNID™ and QT-600 Ensuring Quality of Service on Carrier-Grade Ethernet Networks" Accedian Networks Version 1.5 (May, 18, 2007).

"MEF Introduction to Ethernet Services" Rafael Francis ECI Telecom, Dec. 2008.

"MEF Technical Specification MEF x.0 Latching Loopback Protocol and Functionality" The Metro Ethernet Forum created 2009; amendments 2012.

"Remote system Upgrades with Stratix Series FPGAs" ALTERA, Website accessed and document downloaded May 10, 2013.

"Plug & Go™ Loopback—configuring the MetroNID™ to Respond to QT-600 Loopback Commands" Accedian Networks Version 1.1: Feb. 2010.

Series G: Transmission Systems and Media, Digital Systems and Networks—Packet Over Transport Aspects—Ethernet Over Transport Aspects Series Y: Global Information Infrastructure, Internet Protocol Aspects and Next-Generation Networks—Internet Protocol Aspects—Transport Characteristics of Ethernet Transport Network Equipment Functional Blocks International Telecommunication Union—ITU-T Telecommunication Standardization Sector of ITU G.8021/Y.1341 (May 2012).

Series Y: Global Information Infrastructure, Internet Protocol Aspects and Next-Generation Networks—Internet Protocol Aspects—Operation, Administration and Maintenance OAM Functions and Mechanism for Ethernet Based Networks International Telecommunication Union—ITU-T Telecommunication Standardization Sector of Y.1731 (May 2006).

"The extended European search report" on EP patent application No. 13839534.8, European Patent Office, Dated Feb. 19, 2016, 10 pages.

\* cited by examiner

NETWORK SERVICES TESTING WITH PLUGGABLE TRANSCEIVERS

CROSS-REFERENCE TO RELATED APPLICATIONS

The present invention claims priority from U.S. Patent Application No. 61/702,818 filed Sep. 19, 2012, which is incorporated herein by reference. The present Application is a Continuation-in-Part of a U.S. patent application Ser. No. 13/783,871, filed Mar. 4, 2013, entitled "Layer 2 And 3 Latching Loopbacks on a Pluggable Transceiver", which claims priority from U.S. Patent Application No. 61/606,800 filed Mar. 5, 2012, both of which are also incorporated herein by reference.

TECHNICAL FIELD

The present invention relates to pluggable transceivers in communication networks and more particularly to generating and analyzing layer 2 and above network traffic using test-capable pluggable transceivers installed in existing network equipment.

BACKGROUND OF THE INVENTION

Communication Service Providers are deploying a large number of Ethernet and IP services across networks and across a large number of Network Equipment Manufacturers (NEMS).

The support for Ethernet test and turn-up functions differs largely from one network equipment provider to another and this dramatically increases the operational complexity of deploying Ethernet based services across networks and across equipment vendors.

Network Elements (NEs) in today's networks are owned and managed by many parties that have interests in different portions of the Ethernet networks. To support the different needs of these parties, different types of services are being deployed over these networks.

One type of service being deployed is Ethernet Virtual Connections (EVCs). EVCs are logical representations of Ethernet services as defined by associations between 2 or more physical interfaces. EVCs may be deployed to differentiate traffic on Ethernet networks.

When a telecommunications service provider offers a Metro Ethernet service that is compliant with the Metro Ethernet Forum (MEF) specifications, the service has two basic elements: the UNI or ENNI (External Network to Network Interface) by which the service is provided to the customer, and an EVC that establishes a communication relationship between one or more UNIs or ENNIs. In Metro Ethernet services, there are three types of EVC: point-to-point, multipoint-to-multipoint and point-to-multipoint. Another type of service being deployed over Ethernet networks includes transporting traffic at different network layers such as Layer 2 (Ethernet frames) and Layer 3 (IP packets).

When test features are not implemented inside existing networking equipment, external Network Interface Devices (NIDs) or traffic generation equipment is inserted in-between equipment or attached to ports designated for these testing functions. These testing methods have significant drawbacks as they require extra equipment; extra rack space, extra cost and these additional pieces of equipment may introduce additional networking issues.

FIG. 1 illustrates how testing functions are typically implemented in prior art networks. In FIG. 1, heterogeneous NEs 2, 4, 6, 8, which may be provided by different manufacturers and may significantly differ from each other in capabilities, are connected in a network 5 such as by fiber optical cabling. The NEs 2, 4, 6, 8 have ports to receive transceivers 12, which provide electro-optical interfaces between NEs 2, 4, 6, 8 over the network 5. Some NEs, such as NE_A 2, have testing capability 11 and some do not, such as NE_B, NE_C and NE_D. Accordingly, NIDs 36, 38 have been added to provide additional test functions in a network between NE_B and NE_C. Certain parts of the network either cannot be covered or would be difficult to cover with test functions, such as NE_D 8 that is located in a constrained location 20 where no NID box or Network test equipment can be added. For example, adding NIDs near NE_D, which may be located in a wireless access tower, may not be possible due to physical constraints or other location restrictions.

NE_A 2 adds cost to the network 5 and additionally occupies a dedicated port on NE_B, which potentially reduces the amount of revenue from services the network operator can generate. While NE_A 2 and NIDs 36, 38 implement test functions, they also may not have the same management interface thus making them more difficult to use and maintain.

In the example in FIG. 1, installing NIDs 36, 38 is possible between NE_B 4 and NE_C 6 because, for example, the network administrator has access to the cabling between those two NEs and can physically interrupt those lines, install and manage additional NIDs. However, in FIG. 1, there are no NIDs between NE_C 6 and NE_D 8 because, for example, NE_D 8 may be located in the constrained location 20 where no NIDs could be added. In many cases, certain parts of the Ethernet network 5 cannot be covered, or would be excessively difficult to cover with test functions by the addition of NIDs due to physical constraints, such as NEs that are poles. As a result, it is common for the test functionality 11 to be unavailable in parts of the network 5. Although NE_A 2 and the NIDs 36, 38 implement test function 11, it is common that they do not share the same management interface making managing all of the network test functions difficult and disconnected.

Accordingly, prior art communication networks typically include segments that are not covered by necessary test functions and those that are covered have additional expenses associated with them. It would be advantageous to have a simple, cost effective and unified way to add Layer 2, Layer 3 and higher Layer testing functionalities on existing network equipments.

SUMMARY OF THE INVENTION

According to one aspect, a method if provided for performing network measurements in an Ethernet network comprising a plurality of network elements (NE), the method comprising: a) providing a central test server connected to the network; b) providing a pluggable transceiver (PT) connected at one of the plurality of NEs for receiving and transmitting network traffic, the pluggable transceiver comprising a programmable logic array containing a test logic module; c) providing a mediation sub-system in communication with the central test server and the PT, the mediation sub-system comprising logic for generating transceiver-executable commands and for communicating said commands to the pluggable transceiver in response to receiving test requests; d) using the central test server to generate a test request and to communicate the test request to the mediation sub-system; e) using the mediation sub-system to translate the test request into a sequence of transceiver-executable commands and to communicate said commands to the PT, wherein said commands comprise one or more network service parameters identifying a network service to be tested; f) receiving, at the PT, the sequence of transceiver-executable commands, and storing the received network service parameters in memory; and, g) using the test logic module of the PT to execute the received transceiver-executable commands to perform a network test.

A further aspect of the present invention provides a system for performing network measurements in an Ethernet network comprising a plurality of network elements (NE). The system comprises a plurality of pluggable transceivers (PT) installed at the plurality of NEs for receiving and transmitting network traffic, a central test server for generating a network test request and for collecting test results, and a mediation sub-system in communication with the central test server and the plurality of the pluggable transceivers for receiving the network test request from the central test server, for translating said request into a sequence of transceiver-executable commands, and for communicating said commands to the pluggable transceivers for executing sub-tests corresponding to the test request. Each pluggable transceiver of the system comprises a programmable logic array containing a test logic for executing the transceiver-executable test commands.

A further aspect provides a pluggable transceiver for use in a network element of an Ethernet network for performing network measurements and for receiving and transmitting network data, the transceiver comprising: a downstream datapath for relaying frames downstream through the transceiver, an upstream datapath for relaying frames upstream through the transceiver, a host controller interface, and a programmable logic array disposed in the upstream and downstream datapaths. The programmable logic array comprises: a filter logic for detecting management frames received by the transceiver in at least one of the upstream and downstream datapaths; a management protocol logic (MPL) operatively connected to the filter logic and the host controller interface and configured for receiving and parsing test control commands contained in the management frames or received over the host controlled interface and for extracting therefrom one or more network service parameters identifying a network service to be tested and one or more test parameters; a network service memory for storing the one or more network service parameters; and, programmable test logic (PTL) operatively connected to the management protocol logic for communicating therewith and comprising at least one of a test frame generation logic and a service statistics generation logic.

Where alternative embodiments and additional aspects of those embodiments are described in the present disclosure, these embodiments and aspects may be combined in any manner within a single embodiment unless the present disclosure suggests otherwise. While preferred embodiments may be illustrated or described herein, they are not intended to limit the invention. Rather, numerous changes including alternatives, modifications and equivalents may be made as would be understood by the person skilled in the art.

BRIEF DESCRIPTION OF THE DRAWINGS

The invention will be described in greater detail with reference to the accompanying drawings which represent exemplary embodiments thereof, in which like reference numerals indicate like elements, and wherein.

DETAILED DESCRIPTION

Traditional pluggable transceivers 12 are very small (e.g. small form-factor) and perform very limited functionality but have the advantage of being part of most existing networking equipment by most network equipment manufacturers. Pluggable transceivers 12 are pluggable in the sense that they are easily replaceable components that have a common and widely accepted physical interface on network equipment. Small form-factor pluggables (SFPs) are a popular industry format jointly developed and supported by many network equipment manufacturers and vendors. Enhanced small form-factor pluggable (SPF+) supports data rates up to 10 Gbit/s.

Pluggable transceivers 12 provide input and output interfaces between network elements (NEs) like switches, routers, etc. and fiber optic cables. Some of these interfaces perform conversions between optical and electrical signals. Small form-factor pluggable (SFP) transceivers support communications standards including synchronous optical networking (SONET), synchronous digital hierarchy (SDH), gigabit Ethernet and fiber channel. Other interfaces are purely electrical, for example copper SFPs that do not contain an optical-electrical conversion or use fiber optic cables.

Pluggable transceivers 12 typically follow a very detailed specification defined under industry MSAs (MultiSource Agreements). Pluggable transceivers are globally accepted by the networking community. Their small mechanical form factor and their simple interfaces are well defined. It would be advantageous to embed Layer 2, Layer 3 and higher network testing functions on them without disturbing their primary requirements and functionalities as a pluggable transceiver.

Furthermore, programmable gate arrays such as FPGAs have decreased in physical requirements sufficiently that they can be included within a pluggable transceiver 12 without increasing their physical size and without substantially changing the throughput, power and heat dissipation requirements.

Figure 1:
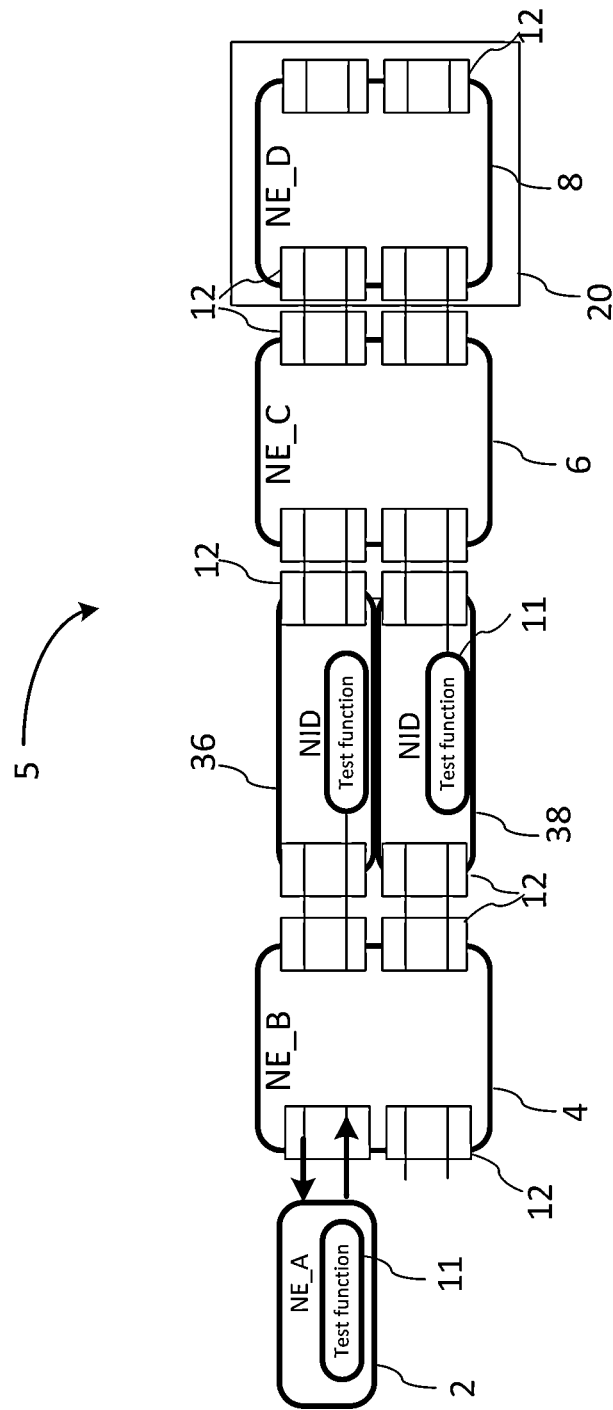
FIG. 1 is a schematic block diagram of a prior art network including network testing functionalities.
Figure 2:
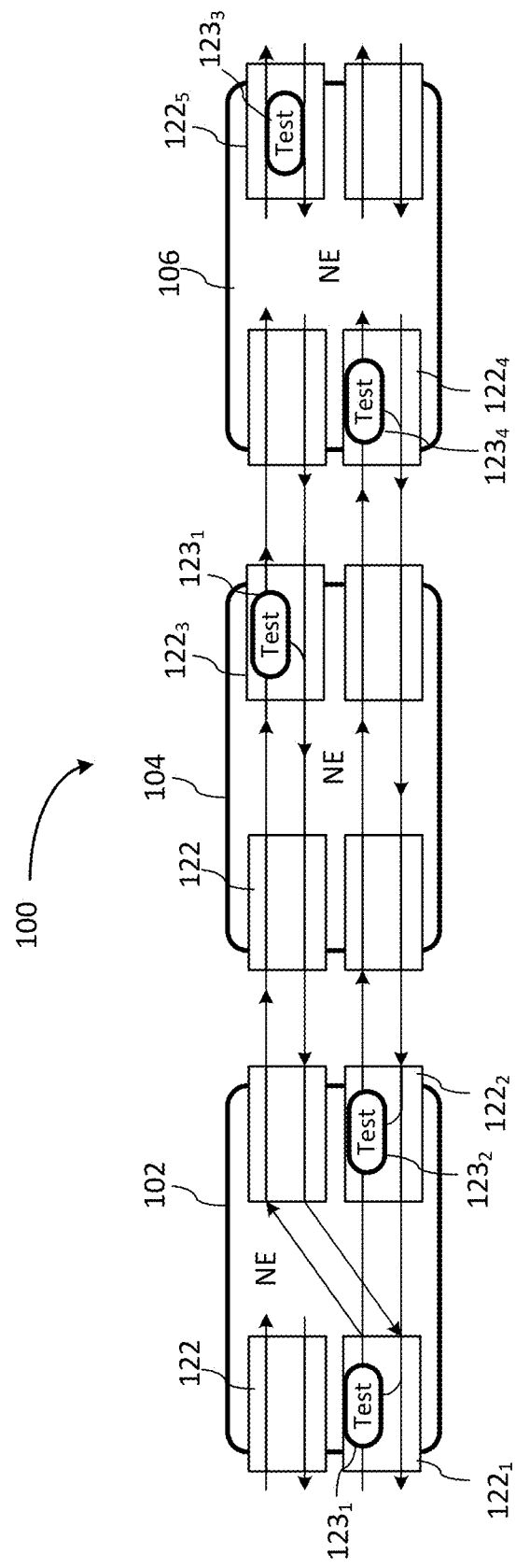
FIG. 2 is a schematic block diagram of a network link implementing pluggable transceivers according to the present disclosure.

Referring now to FIG. 2, an Ethernet network 100 is illustrated where heterogeneous network elements 102, 104, 106 each have pluggable transceiver ports which receive, in place of traditional pluggable transceivers 12, test-capable pluggable transceivers (PTs) 122 in accordance with embodiments of the present disclosure, including specific instances of pluggable transceivers 122 that are labeled $122_1$-$122_5$, which are also generally referred to herein as pluggable transceivers 122 or PTs 122 and described more specifically hereinbelow. Similar to the NEs of FIG. 1, NEs 102, 104, 106 may be heterogeneous; that is, they may be made by different vendors and operated by different service providers so long as they can receive pluggable transceivers 12, 122.

The pluggable transceivers $122_1$-$122_5$ are explicitly shown to include programmable test modules $123_1$-$123_4$, which are generally referred to herein as the test modules or logics 123, and which, according to the present disclosure, may implement various combinations of Layer 2, Layer 3 and higher network layer test functions internally to the transceiver. The transceivers 122 can be SFPs, XFPs, SFP+, CFPs, QSFPs or any other format of pluggable transceiver so long as the FPGA technology, or other reprogrammable microprocessor technology having suitably small footprint and power requirements become available. By adding logic arrays such as either FPGA or ASIC, or a suitably small microprocessor, within the transceivers 122, more networking test functions such as monitoring and testing of selected network services can be added directly at the interfaces of any network element that receives pluggable transceivers. Having test functions in the transceivers adds new diagnostic capabilities to complement and unify the existing network, particularly those built with NE's lacking any unified test capability.

Figure 3:
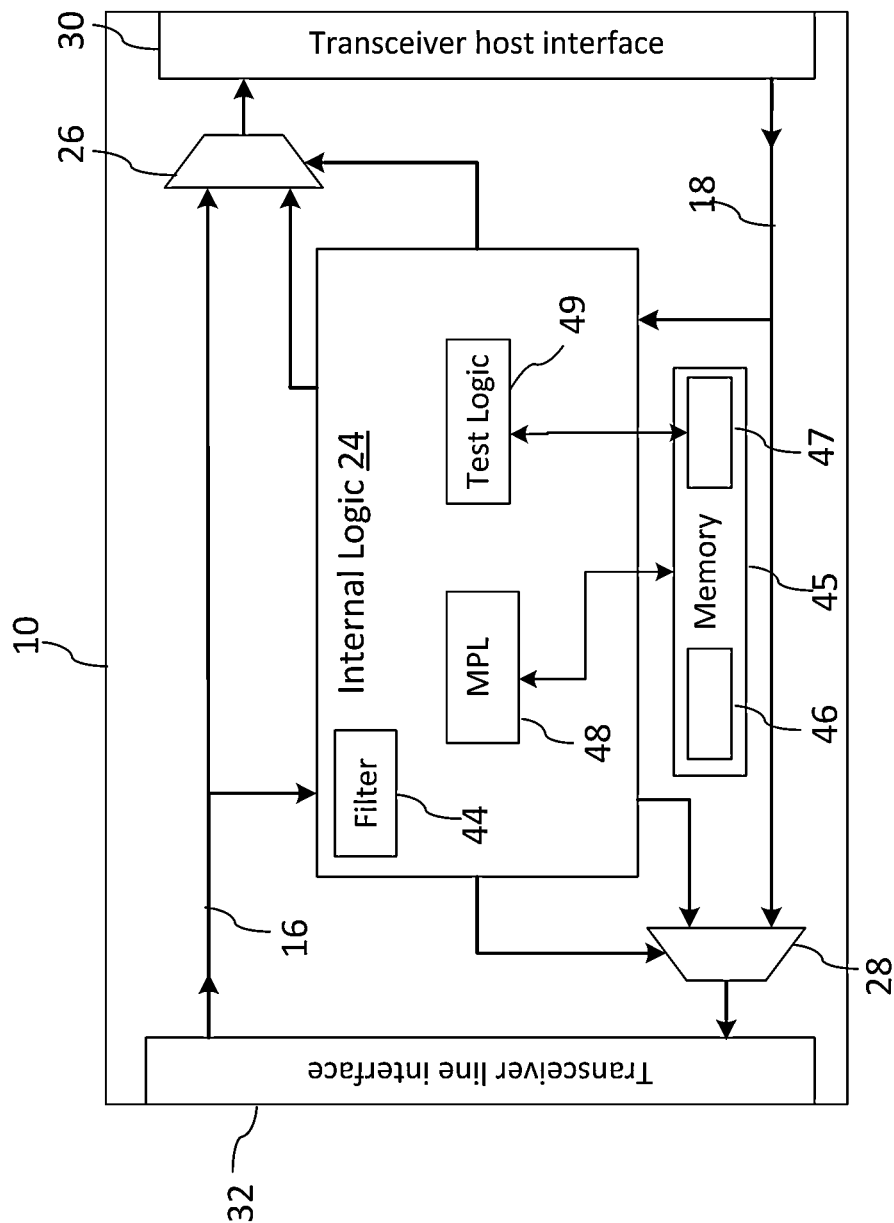
FIG. 3 is a schematic block diagram illustrating a programmable pluggable transceiver having a programmable logic gate array with test logic configured therein.

Referring now to FIG. 3, a logic gate array 10 of an exemplary programmable pluggable transceiver 122 is illustrated. In a currently preferred embodiment, the logic gate array 10, which is also referred to herein as the programmable logic array or simply as logic array, is implemented using an FPGA, but may also be implemented using an ASIC, or a suitable microprocessor. The internal logic 24 of the logic gate array 10 allows the transceiver to insert new frames or loopback, filter, process and/or terminate incoming traffic frames on either datapath 16, 18. Multiplexer logic 26, 28 intersects each datapath 16, 18 respectively. Each multiplexer logic 26, 28 may receive frames from internal logic 24 to be inserted into the datapaths 16, 18 for example during idle periods in traffic. Selection of which source the multiplexer logic 26, 28 passes through the datapath 16, 18 is controlled by internal logic 24. In the context of this specification, the term "logic", when used in wordings such as "internal logic", "test logic", "filter logic" and the like, may refer to hardware-based logical circuits such as those that may be configured in an FPGA or similar programmable logic gate devices by programming, but may also encompass logic modules implemented in software to be executed by a suitable processor.

The internal logic 24 can inspect incoming frames on either datapath 16, 18 for filtering, looping-back, processing and/or terminating incoming frames. The internal logic 24 can also generate control frames, or any other new frames, which are inserted in between regular traffic frames in either datapath 16, 18 as shown in FIG. 2. Frame buffering and scheduling logic within the internal logic 24 may handle hitless transitions between frames from different sources. Multiplexer logic 26, 28 controlled by internal logic 24 manages the insertion of frames from the internal logic 24 into the datapaths 16, 18 and ultimately through the transceiver host interface 30 or transceiver line interface 32 respectively. The transceiver host interface 30 and transceiver line interface 32 may perform data conversions, if any are necessary between the transceiver and the logic gate array 10.

In accordance with an aspect of the present invention, the logic gate array 10 includes a management protocol logic (MPL) 48 for supporting the management protocol for communications with a mediation sub-system 233 as described hereinbelow with reference to FIG. 4. MPL 48 is configured for receiving and parsing test control commands, which may be delivered for example in a payload of management frames received over the network, and for extracting therefrom test configuration parameters, including one or more network service parameters identifying a network service to be tested. A filter logic 44 is provided for detecting the management frames received by the transceiver in at least one of the upstream and downstream datapaths 16, 18. The filter logic 44 may also be configured to perform additional frame recognition and processing tasks as described hereinbelow. A memory space 45 is configured within the logic array 10 and made accessible to the MPL 48 for saving the test configuration parameters received by the transceiver from the mediation sub-system 233 through the management protocol. Logic array 10 further includes one or more programmable test logic (PTL) modules 49, which are operatively connected to MPL 48 for communicating therewith, and which are configured for performing network tests such as generating test frames for transmitting over the network, or collecting statistics associated with a network service. The memory space 45 includes a memory region for saving the network service parameters 46, and one or more memory regions 47 individually associated with the one or more test logics 49 for saving other test-related parameters that are used to program and/or control the test logics 49. The memory regions 47 may be mapped to the test logic 49 associated therewith to form an internal memory of the corresponding test logic 49. The memory space 45 may be embodied, for example, using registers of the logic array 10 configured as memory, embedded RAM of the logic array 10, other memory means that may be provided with the logic array 10, or any combination thereof.

The logic gate array 10 illustrated in FIG. 3 can be divided into three parts: internal logic 24, core logic and connectivity logic. As above, internal logic can be any functionality that one could desire in a programmable pluggable transceiver. Core logic performs the basic hitless pass-through functionality of a transceiver. Core logic comprises the transceiver host interface 30 and the transceiver line interface 32. Connectivity logic combines the outgoing data from the two other parts onto datapaths 16, 18. In FIG. 3, connectivity logic comprises the multiplexor logic 26, 28 but is controlled by the internal logic 24.

U.S. patent application Ser. No. 13/850,422 owned by the Applicant, filed Mar. 26, 2013, entitled "Upgrading A Programmable Logic Gate Array In An In-Service Pluggable Transceiver", and incorporated herein by reference, describes how to upgrade the internal logic of the programmable logic gate array of a programmable pluggable transceiver with the test modules 123 or 49 to provide a desired test functionality while the programmable pluggable transceiver remains in service using existing datapaths and without degrading the basic hitless pass-through functionality of the core logic of the transceiver.

U.S. patent application Ser. No. 13/783,871 owned by the Applicant, filed Mar. 4, 2013, entitled "Layer 2 And 3 Latching Loopbacks on a Pluggable Transceiver", which is incorporated herein by reference and of which the present disclosure is a continuation-in-part, describes how to provide a latching loopback test functionality using the internal logic of programmable pluggable transceivers in communication networks for the purpose of network testing.

Referring back to FIG. 2, the programmable test modules 123 in the transceivers 122 add, complement, simplify and unify the overall system test functions on existing networks that were built with networking equipments (NEs) not having unified test capability. Rather than replace each network element in an effort to provide a network test functionality, and rather than installing NIDs at all possible locations, transceivers 122 may replace traditional transceivers and concurrently provide network test functionalities. The costs and effort to replace an existing NE's pluggable transceivers with transceivers 122 with internal network test support capabilities are low compared to the costs and effort to replace, a whole NE with a new NE that has network test capabilities. Even in constrained locations 20 of the network of FIG. 1 it is possible for transceiver 122 to replace transceiver 12 because the two transceivers 12, 122 have a common form factor. From a network administration perspective, there is very little change: there is no need to replace any of the NEs with different, test capable NEs, or to add NIDs; accordingly, there are no new NEs to configure and test in the network.

FIG. 2 illustrates an exemplary configuration of the transceivers 122 in the network 100 that supports three different network tests of many that are enabled by the present disclosure. In one test example, the programmable logic gate arrays of transceivers $122_1$ at NE 102 and $122_3$ at NE 104 are programmed to include a first test logic module (TLM) $123_1$, which is configured to inject streams of OSI Layer 2 (Ethernet) test frames in a one-way manner through the network that is non-intrusive to the existing customer network traffic, and which is further configured to collect statistics on received test frames for a retrieval by a mediation function, as described hereinbelow. If testing is being run on an unprovisioned EVC, the user can use the test to validate that the EVC's service parameters are met prior to being provisioned later. The known in the art general strategy for testing headroom on a port or EVC may be used in the test for identifying opportunities to expand customer services while leaving existing services unaffected.

The second test example uses transceiver $122_2$ installed at another port of NE 102 and transceiver $122_4$ installed at NE 106. Transceiver $122_2$ is programmed with a second TLM $123_2$, which is configured to inject streams of test frames to a "latching loopback" (LLB) at the NE 106. This LLB is implemented in the transceiver $122_4$ using TLM $123_4$ that returns the packets back to the source transceiver $122_2$ for round-trip statistics creation. The LLB functionality implemented in the transceiver $122_4$ can be deployed in the network directly through the host NE 106 or through the use of an OAM protocol as described hereinbelow. In the latter scenario, the LLB test capability provided in the transceiver $122_4$ may be discovered by a mediation sub-system using the OAM protocol and then enabled for either the EVC under test or the full port hosting the transceiver $122_4$. When frames received at transceiver $122_4$ are found by the transceiver logic to match a condition for the EVC, or when the full port is enabled for the LLB, the received frames are manipulated by TLM $123_4$ to swap address fields and any necessary upper layer fields, and then returned down the interface path from which they were received. As the test frames have been generated and returned to the source TLM $123_2$, results are retrieved by the management protocol from the source transceiver $122_2$ that is sourcing the test frames, and aggregated by the mediation sub-system to the server. In this example, the user can qualify round-trip delays, frame loss and measured jitter.

In the third test example, TLM $123_3$ is deployed into the transceiver logic of transceiver $122_5$ for monitoring of the existing network traffic and generating service-related or port-related statistics for the monitored traffic. Information specifying the EVCs of interest, or the entire port if chosen, are provided to the transceiver logic, and the mediation sub-system is responsible for polling performance management statistics from the transceiver at desired polling intervals. If the polling interval were to be interrupted due to communications error or equipment going offline, results may continue to accumulate in the transceiver until a connection can be reestablished, as described hereinbelow.

The test capabilities of the transceivers 122 provided by the test modules 123 and internal filter logic may also extend beyond the basic layer 2 EVC tests by reaching to higher layers in the network stack. By way of example, various logic modules within the transceivers 122 may be configured to provide functions, such as support for parsing of higher layer headers, to cover Layer 3 IPv4 and IPv6 test stream generation, including generating test streams with bandwidth profiles emulating customer IP services as required by RFC-2544 and emerging Y.1564 standards. The tests streams can be parameterized to cover various routing and priority scenarios that take advantage of layer 3 addressing and protocol fields such as type of service, priority and flow labels.

Figure 4:
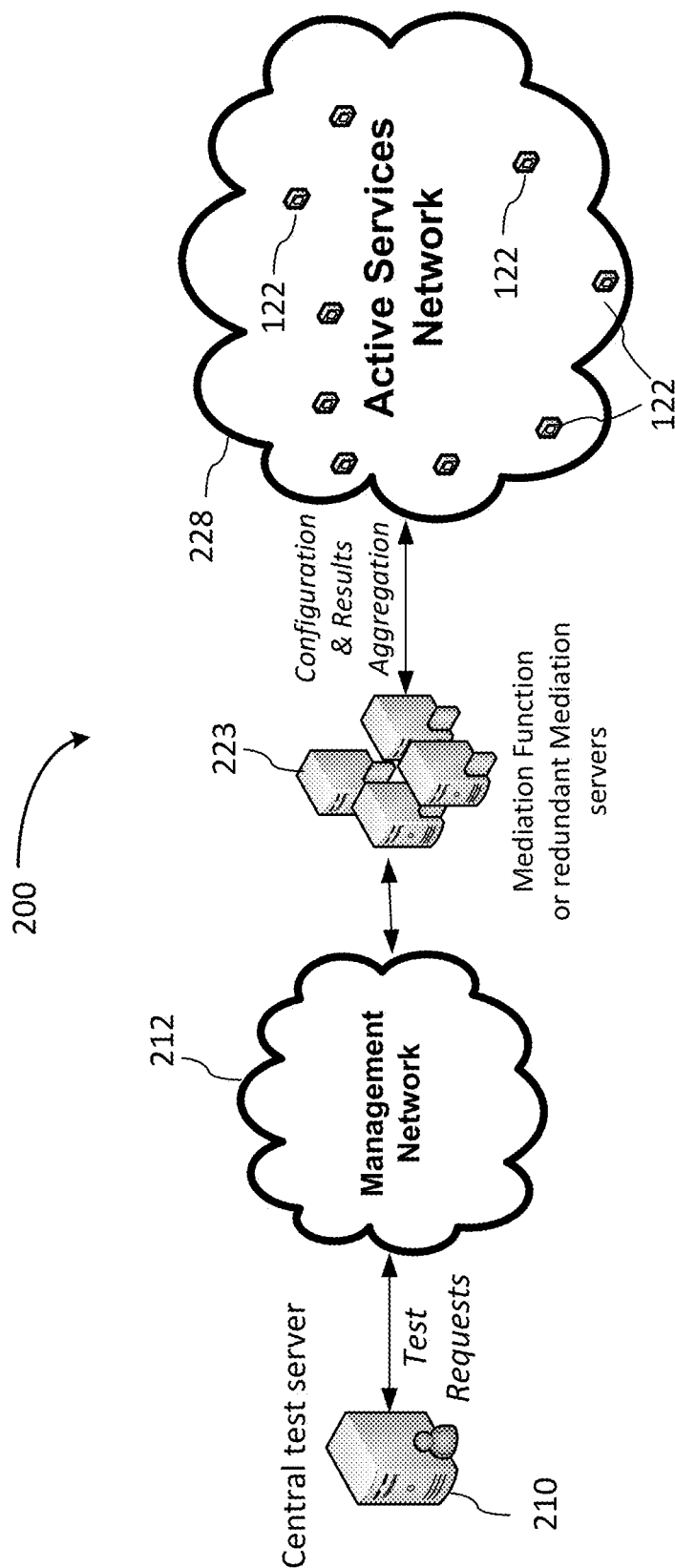
FIG. 4 is a schematic block diagram of a network testing system according to the present disclosure.

Referring now to FIG. 4, there is illustrated an exemplary network test system 200 for testing an active services network 228, which includes a plurality of transceivers 122 installed at various locations within the network 228. In order to implement and support test capabilities in an environment restricted by space, power and accessibility such as that provided by the pluggable transceiver, system 200 spreads knowledge of the test requirements and test functions across the transceivers 122, a mediation sub-system 223, which is also referred to herein as the mediation function (MF), and a central test server 210.

In one embodiment, the test server 210 maintains a high-level knowledge of various test parameters and results, and provides an interface for the user to submit their test requests and retrieve test results from single network tests or groups of tests with optional result correlation. The central test server 210 may be implemented at a remote location outside the network 228, for example using a general purpose computer or a portable computing device, or can be implemented in a network element within the active services network 228. In the illustrated example, the test server 210 is operatively connected to the MF 223 through a management network 212, which may take any form suitable for supporting data communications between the test server 210 and the MF 223, including but not limited to the Internet, a proprietary network of the service provider which may or may not be implemented as a closed sub-network within the active services network 228, a wireless network, or the like.

Operationally, the mediation sub-system 223 is disposed in-between the central test server 210 and the plurality of pluggable transceivers (PT) 122. It communicates with the central server 210 so that it can receive test requests therefrom, and is configured to translate, i.e. convert, the received test request into one or more sequences of transceiver-executable commands, and to communicate these commands to the pluggable transceivers 122 for executing sub-tests corresponding to the test request. The transceiver-executable commands that are communicated by the mediation sub-system to the PTs for programming and/or controlling thereof to execute a test are also referred to herein as the test control commands. In one embodiment, the mediation sub-system 223 uses a common management protocol to communicate the commands and related parameters to the PTs 122 and to receive test results therefrom.

In one embodiment, MF 223 is responsible for decomposing the network test request, as received from the central test server 210, into one or more sub-tests and translating various steps of these sub-tests into commands understood by the transceivers 122. For example, MF 223 may decompose the network test request into several sub-tests directed to different transceivers 122 or different groupings of the transceivers, depending on their location within the network 228 to be tested. MF 223 may store a plurality of test scripts composed of sequences of transceiver-executable commands, and may select between those scripts in dependence on the received test request, and execute the selected test scripts wherein the MF 223 transmits or otherwise communicates corresponding sequences of transceiver-executable commands to the appropriate transceivers 122. In some embodiments, MF 223 may, during the execution of the selected test script, send a command or a series of commands to the transceiver 122 to change a test configuration parameter at the PT, thereby re-programming one or more test modules during the test script execution. Examples of the test configuration parameters that may be changed by the MF 223 during the execution of a test include parameters defining the rate of test frame generation at the PT, or any of the payload characteristics, such as size, byte pattern, etc.

By way of example, the RFC-2544 test methodology, as defined by the Internet Engineering Task Force, requires a search algorithm for increasing and/or decreasing the requested test frame bandwidth depending on the presence or absence of errors to determine a maximum frame rate, or CIR, that is continuously supportable by the network, a link in the network or a particular network device. According to an embodiment of the present invention, this type of algorithm execution is managed by the MF 223, which executes the search algorithm wherein parameters determining the rate of test frame generation by the transceiver vary, and communicates each change in one or more test configuration parameters related to the test frame rate to the test frame generation logic of the pluggable transceiver. Further by way of example, this may include sending a command to a first PT 122 to start the test frame generation at a 100% of a maximum requested bandwidth, sending a command or commands to a second PT 122 to configure it to loopback the test frames received from the first PT 122, and a command or commands to the first PT 122 to measure errors in the returned test frames and communicate them back to the MF 233. If the errors are present, the MF 233 then sends a command or commands to the first PT 122 to change the frame rate to a smaller value, for example 50% of the maximum CIR, and to communicate back a detected errors count. If no errors are detected, the frame rate is then raised by the MF 233 to, for example, 75% of the maximum CIR, however in the event that errors are detected again, the frame rate at the first PT 122 is then decreased by the MF 223, for example to 25% of the maximum CIR. The MF 233 may execute this binary search algorithm, or another suitable search algorithm, until the test is passed reliably, i.e. no errors in the looped back test frames are detected, and then reports the found maximum error-free frame rate value to the test server as the approved throughput bandwidth for communicating to the user.

Additionally, MF 223 communicates with one or more of the transceivers 122 to retrieve low-level test results obtained by the individual transceivers, aggregates the results, and generates higher-level statistics when requested by the central server 210. The results polling may be accomplished on-demand or through the use of a performance management polling interval. On completion of the sub-tests, the aggregated results are returned to the central server for collection and display to the user. In the example of the RFC-2544 test, the results that the MF 223 polls from the individual transceivers 122 may include counters of transmitted and received packets and bytes, frames lost count, frames detected out of sequence count, accumulated frame delay, and others as known in the art and as may be required by industry standards, while the test results that MF 223 communicates back to the test server 210 may also include total packets and bytes over all sub-tests, measured CIR, percentage of frames lost, average frame delay, and other related network measurements.

As the transceiver 122 relies on the mediation function 223 for the implementation of test algorithms and the aggregation of results, the transceiver 122 does not require a powerful processor that would have been needed to manage the complete test strategy execution. Also, the size of test counters is minimized, state machines that may be implemented by the transceiver test logic simplified, and overall test execution is more robust resulting in a compact design that fits a small logic footprint and uses less power. Simplifying the pluggable transceiver logic requirements enables a smaller logic implementation, opens up the opportunity to use FPGA technology with its flexible architecture, and preserves a path to upgradeability to modify or future-proof the included test logic.

Figure 5:
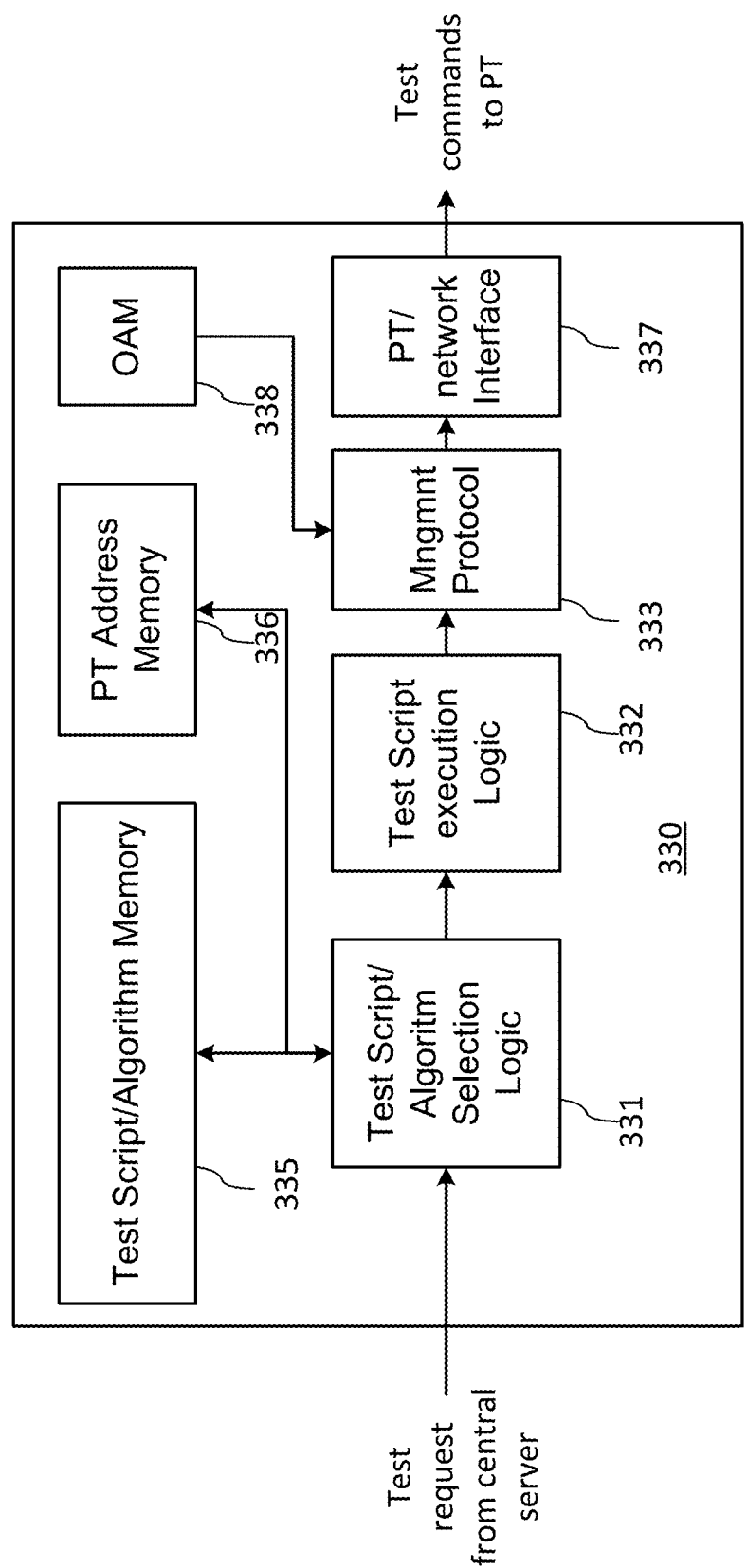
FIG. 5 is a logical block diagram of a mediation server according to the present disclosure.

An aspect of the present invention therefore provides a method for performing network measurements in the Ethernet network 228, which includes the following general steps: a) providing the central test server 210; b) providing at least one pluggable transceiver (PT) 122 connected at one of a plurality of NEs of the network for receiving and transmitting network traffic, the pluggable transceiver 122 including a programmable logic array such as logic gate array 10 containing a test logic module 49 or 123; c) providing a mediation sub-system 233 in communication with the central test server and the PT 122, wherein the mediation sub-system 233 includes logic for generating transceiver-executable commands and for communicating said commands to the pluggable transceiver in response to receiving test requests, such as described hereinbelow with reference to FIG. 5; d) using the central test server 210 to generate a test request and to communicate the test request to the mediation sub-system 233; e) using the mediation sub-system 233 to translate the test request into a sequence of transceiver-executable commands and to communicate said commands to the PT 122, wherein said commands include one or more network service parameters identifying a network service to be tested; f) receiving, at the PT 122, the sequence of transceiver-executable commands, and storing the received network service parameters in memory such as memory 45 of FIG. 3; and, g) using the test logic module 49 or 123 of the PT 122 to execute the received transceiver-executable commands to perform a network test.

With reference to FIG. 5, there is illustrated a schematic functional diagram of a mediation server 330, which may implement at least some functionalities of the MF 223 in an embodiment of the present invention. It includes a test script memory 335, which stores a plurality of tests scripts implementing a plurality of test algorithms, an optional PT memory 336 for storing network addresses of all PTs 122 that are registered with the mediation server 330, a test script selection logic 331 for selecting one or more test scripts in response to receiving a test request from the central server, a test script execution logic 332 for executing the selected test script or scripts, and a management protocol logic 333. Examples of test algorithms or scripts stored in the test memory 335 include algorithms and scripts implementing methods for generating test streams and collecting related network statistics to validate customer services such as those described in industry standard documents such as Y.1564, Y.1731, 802.1ag, 802.1 ah, 802.1q, and various other Ethernet testing standards.

The management protocol logic 333 implements a management protocol that mediation server 330 employs to configure the test logic of the transceivers 122 for specific tests and to control the test execution by the transceivers 122. This management protocol, which defines a set of commands and command parameters for execution by the transceivers, provides a common method for interfacing with all of the installed transceivers 122 in the network. This management protocol is also used to collect results from the transceivers 122. In some embodiments, one mediation server 330 may be used to control, and collect results from, a large number of the transceivers 122 and their geographies. The test results collected by the mediation server 330 can then be correlated by the central test system 210 across different PTs 122 and/or different network services to detect problems associated with specific hosts, specific network locations, or specific network services, for example using known in the art approaches.

In order to successfully manage potentially thousands of transceivers, the MF 233 may incorporate a plurality of mediation servers 330, which may be located throughout the network, and employ industry standard redundancy and load sharing techniques.

In one embodiment, the transceiver-executable commands and command parameters generated by the management protocol logic 333 of the MF 330 are transmitted to the destination transceivers 122 over the network 228 in a payload of control frames, which are also referred to herein as the management frames, using a network interface 337 of the mediation server 330.

Figure 6:
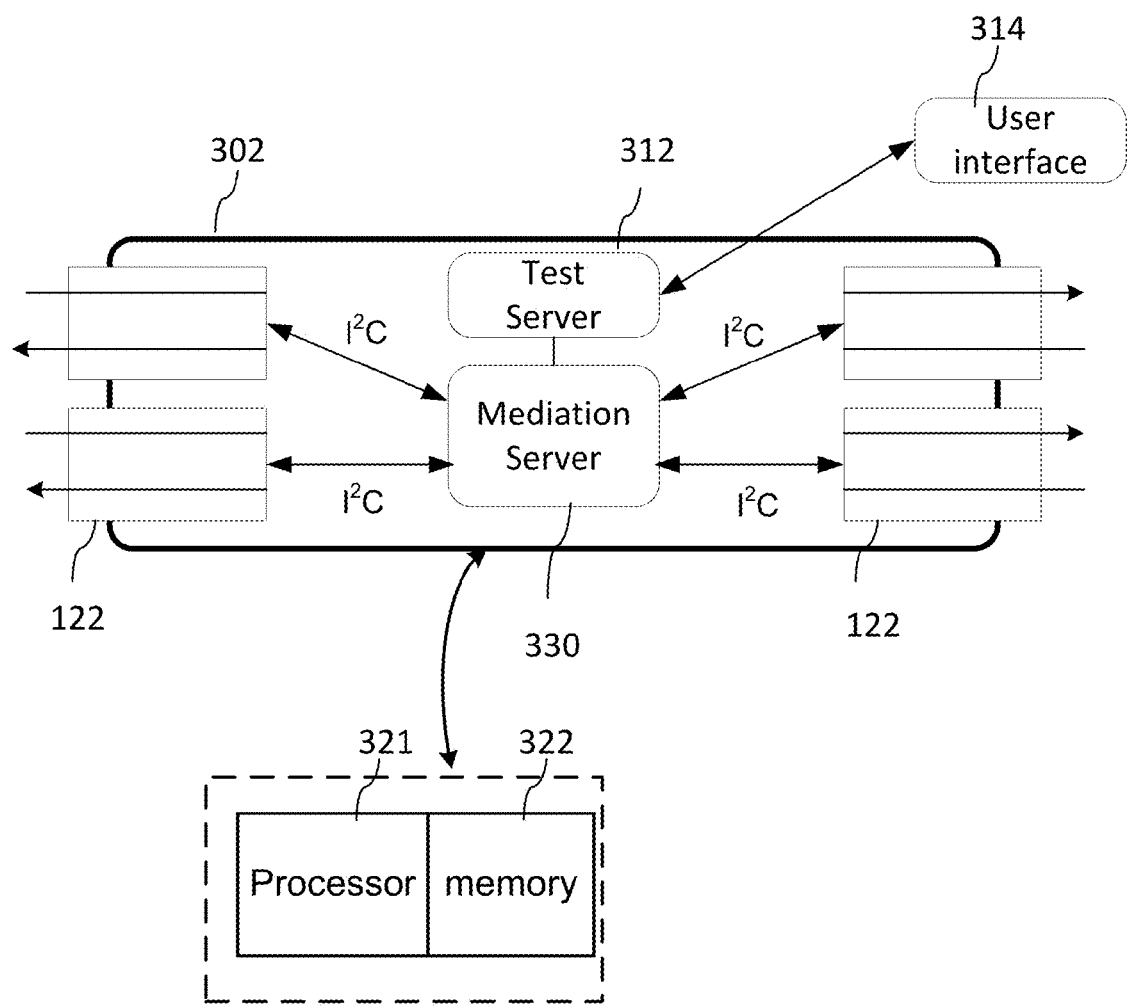
FIG. 6 is a logical block diagram illustrating a network element incorporating a mediation server.

With reference to FIG. 6, in a more compact deployment, network equipment NE 302 hosting one or more transceivers 122 may also implement other components of the test system 200, such as the mediation server 330 and, in some embodiments, a local test server 312. In such embodiments, a network element may act as a host system for the transceiver 122, with the mediation server 330 being a part thereof and having the ability to configure the transceiver for executing the test and acquire results through the use of the management protocol and an appropriate interface, such as the I2C interface (bus) that is present on MSA standard pluggable transceivers. In an embodiment wherein the NE 302 includes the test server 312, a user interface 314 may further be provided for receiving test requests from the user and for outputting test results. In the embodiment wherein the test server function, the mediation function and transceivers all reside within a network element, test configuration and results aggregation may be handled internally by the host system software. Examples of results interfaces in network elements may include a login for command-line usage or an element management system that is commonly deployed in network systems.

In another embodiment, the test server 312 and the user interface 314 may be implemented using an external computer, for example a portable computing device that may be connected to the NE 302 using a suitable communication interface, such as but not exclusively an Ethernet port, or wirelessly.

In FIGS. 5 and 6, various blocks of the mediation server 330 are functional or logical units that may be implemented using one or more digital processors and memory elements or devices, including but not limited to FPGA, ASIC, general purpose processors, microprocessors and the like. In the embodiment of FIG. 6 wherein the mediation server 330 is installed or otherwise provided within the NE 302 that also includes a processor 321, it may be implemented in software using a suitable processor-readable memory device 322 coupled to the processor 321 and containing processor executable instructions for generating the transceiver-executable commands in response to receiving the test request from the test server, for executing by the processor 321.

In another embodiment, the mediation server 330 may be implemented as a stand-alone device that includes a processor, a memory, a network interface and is connected to the network 228.

An important requirement to a network testing system is the ability to test specific network services that are provided or may be provided by the network operators. Conventional pluggable transceivers are pass-through service-agnostic devices that lack knowledge of network services that may be provisioned within the network, and therefore conventional network testing systems implement other equipment to perform service-specific measurement. Advantageously, one aspect of the present invention provides the pluggable transceivers with the knowledge of a network service selected for testing, so that the transceiver 122 may be able to identify received Ethernet frames or IP packets that belong to the selected network service. In one embodiment this is accomplished by using the MF 223 to provide the transceiver 122 with a set of service-related parameters that define the selected service for the transceiver.

Figure 7:
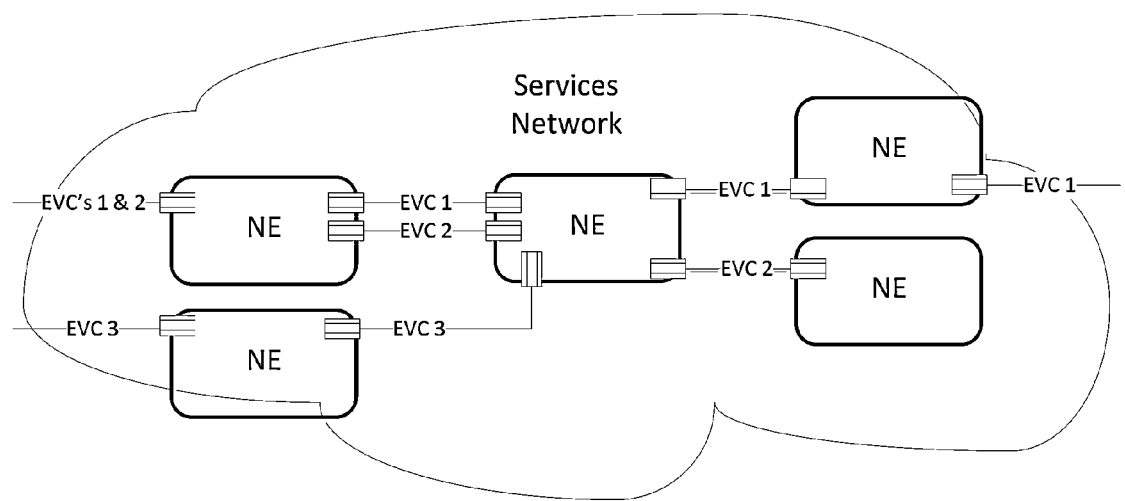
FIG. 7 is a logical block diagram illustrating a portion of a network with three provisioned Ethernet virtual circuit (EVC) services according to prior art.

One example of a network service is the provisioning of an Ethernet virtual circuit (EVC). In order to logically segment Ethernet services and their corresponding data flows on a network, the network operators provision EVC's by configuring their network equipment to identify Ethernet based services, for example as illustrated in FIG. 7 showing an exemplary provisioning of three EVCs 1, 2 and 3 for a section of a network including five NEs. Parameters that may be used to specify an EVC are well known in the industry, and are defined by the MetroEthernet Forum specification 10.2, and typically include the use of Ethernet protocol fields like VLAN tags.

In one embodiment of the present invention, the knowledge of the EVC's, in the form of a set of one or more of EVC-defining parameters, is embedded at the pluggable transceiver level by programming the EVC parameters from the mediation function into the internal transceiver logic, and utilizing the mediation function for executing a test script. Any of the provisioned EVC's in the network may be used for in-service testing through the use of pluggable transceiver based test logic, including frame generation, monitoring and loopback. The transceiver test logic may utilize EVC's defined for test purposes while other EVC's are simultaneously active on the network. Additionally, if a user wishes to do out-of-service testing, for example during a maintenance period, they may choose to block their previously provisioned EVC's and take full control of the transceiver to pursue any of the available testing strategies up to the full bandwidth of the optical or electrical transceiver interfaces.

Figure 8:
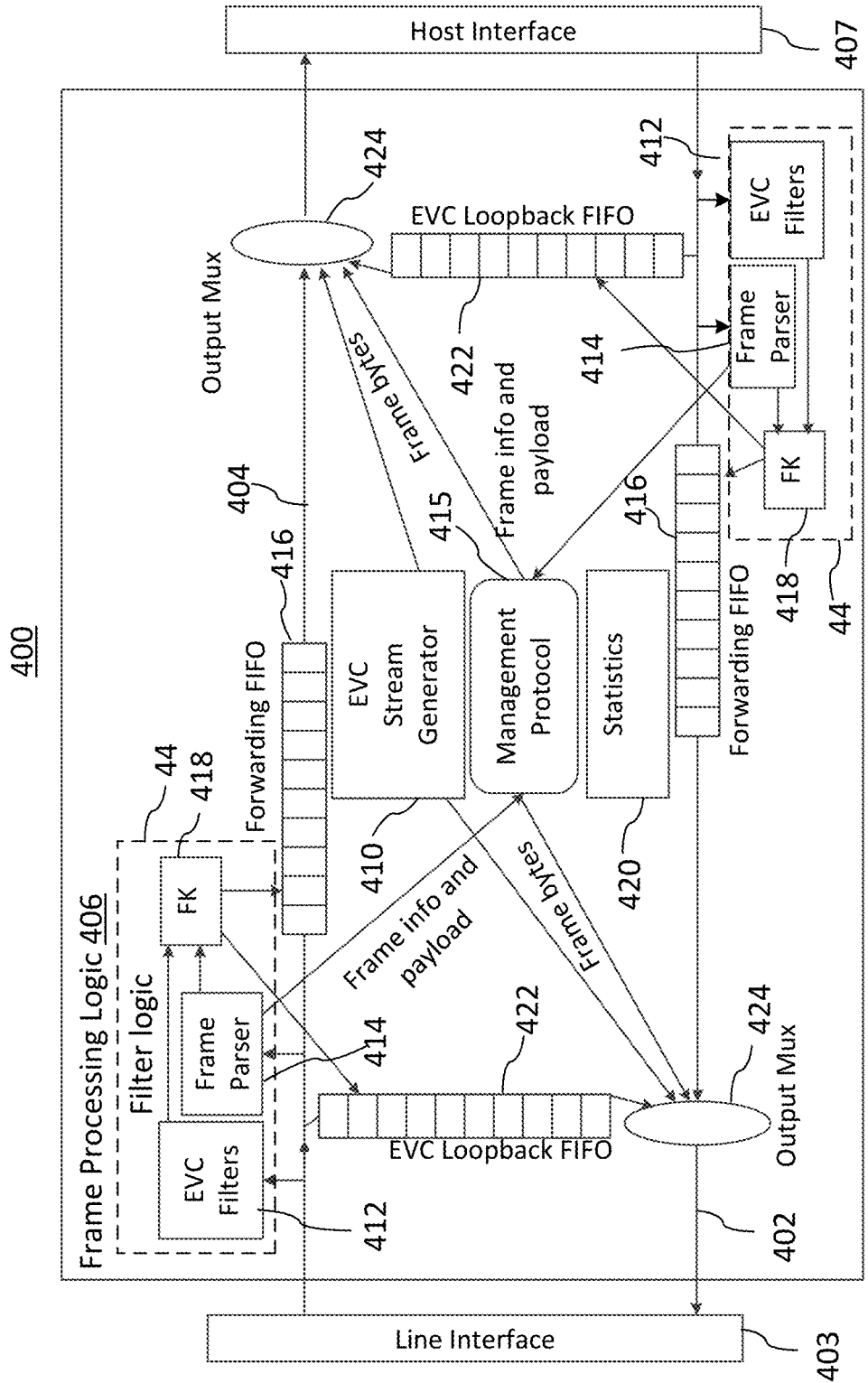
FIG. 8 is a schematic block diagram of a frame processing logic of a pluggable transceiver according to the present disclosure.

With reference to FIG. 8, an exemplary pluggable transceiver 400 that may embody the test-capable PT 122 in accordance with the present invention is illustrated in a block diagram. It includes a programmable logic array embodying a frame processing logic 406, and two main physical interfaces: a line interface 403 and a host interface 407. The frame processing logic 406 in the transceiver contains blocks that can generate, terminate, monitor or pass-through streams of Ethernet test frames in the network on a per port or per EVC basis. The test frames may be transmitted or received on the line or host interfaces of the transceiver. FIFO's 416, 422 and Output Multiplexers (Output Mux) 424 are provided in logic array 406 to merge the frame data from the internal sources to each of the physical interfaces 403, 407.

The pluggable transceiver 400 includes a downstream datapath 402 for relaying Ethernet frames downstream through the transceiver 400, an upstream datapath 404 for relaying Ethernet frames upstream through the transceiver, host interface converter 407, line interface converter 403 and a logic array 406, through which both datapaths 402, 404 pass. In FIG. 8, "upstream" is arbitrarily defined in the right or host direction, while downstream is to the left or line direction. For consistency, this convention is maintained in the rest of the figures and the specification unless otherwise noted.

The commonly understood host interface 407 may perform some signal processing to serialize or deserialize data and other functions as well understood in the art of transceivers, and may include, in addition to datapath ports, a host controller interface such as an I2C bus interface. On electro-optical transceivers the host interface 407 is also referred to as the electrical interface, while the line interface 403 is also referred to as optical interface and performs optical to electrical and electrical to optical conversions as well understood in the art of transceivers. Depending on the configuration of the transceiver 400, the electrical to optical and optical to electrical conversions may be performed on one or the other of the downstream or upstream data paths. The transceiver 400 may also be an electrical-electrical transceiver, in which case the line interface converter 403 performs electrical to electrical conversions, if any are necessary. As described above, there may not be any electrical to optical conversions, as in the case of copper SFPs.

In this specification, the operation of the pluggable transceiver 122, 400 is described with respect to Ethernet frames, which typically refer to a datum at the data link layer (layer 2) of the OSI Model; however, for simplicity of explanation in this specification, it should be understood that Ethernet frames may include higher layer data. In one embodiment, an Ethernet frame passes through the logic array 406 in several uniform size pieces, referred to as units. Each unit may be any number of bits, but is generally, but not always, smaller than an entire Ethernet frame. In some embodiments each unit is one byte in size; however some embodiments may have unit sizes of 2, 4, 8 or more bytes. Pluggable transceivers are required to be transparent with regard to customer service data passing from upstream to downstream or host to line and vice versa. They should also terminate or transparently pass data link negotiation protocols and must include MSA required identification and diagnostics.

The downstream datapath 402 connects through the host interface 407, downstream forwarding FIFO 416, the downstream output Mux 424 and the line interface conversion 403. Conversely, the upstream datapath 404 connects through the line interface conversion 403, upstream forwarding FIFO 416, an upstream output Mux 424 and then host interface conversion 407. A programmable filter logic 44, which may include a frame parser 414, and a frame killer (FK) 418, is further provided at one or each of the upstream and downstream datapaths for filtering and, if required, parsing received Ethernet frames as described hereinbelow in further detail. Depending on the embodiment, the filter logic 44 may include a reconfigurable service filter logic 412 for detecting frames of a selected network service, such as an EVC, among the stream of all frames received at a particular port as also described hereinbelow. The filter logic 44 provides frame termination functions for terminating test and control or management frames that are destined to the transceiver using the FK logic 418, for example by purging the content of the forwarding FIFOs 416 at the appropriate time, so as to ensure that the frame identified for termination is not forwarded along the downstream or upstream data path 402, 404.

In accordance with embodiments of the present invention, the pluggable transceiver 400 may include one or more test logic modules providing network service test functions at Layers 2 and up. As illustrated in FIG. 8, transceiver 400 includes, in addition to the upstream and downstream latching loopback FIFOs 422, two test logic modules—a test frame generator logic 410, which is also referred to as the (test) stream generator, and a frame analysis logic 420, which is also referred to herein as the service statistics collection logic, or simply as statistics logic 420 or statistics block 420. However, other embodiments may include only one or two of these logic blocks providing statistics collection, test stream generation and loopback functionalities, and the same transceiver may be programmed with different test-related logics for different tests. The test logic blocks 422, 410, 420 are examples of upgradeable test logic that may be programmed into the internal logic of the PT 400 as described in the U.S. patent application Ser. No. 13/850,422, with the operation of the latching loopback functionality using loopback FIFOs 422 described in U.S. patent application Ser. No. 13/783,871, both of which incorporated herein by reference.

In the exemplary embodiments described hereinbelow, the network services to be tested relate to specific EVCs, and therefore the stream/frame generator 410 is also referred to as the EVC stream/frame generator 410.

Frame reception, parsing, and filtering logic 412, 414, 418, stream generation logic 410, and statistics logic 420 represent exemplary logic for supporting various types of test scenarios required for testing layer 2 and above services in the network. Control of these subsystems in the frame processing logic 406 is accomplished through a set of test configuration parameters, which PT 400 receives from the mediation function using the management protocol and a management protocol logic (MPL) 415. MPL 415 sets the test configuration parameters at the transceiver by receiving management frames from the mediation function 233 or 330 over optical or electrical ports, or alternatively through the host control interface such as I2C. For example, the test configuration parameters, or a subset thereof, may be used to configure the test streams that are generated by the transceiver frame generation logic 410 to use a specified bandwidth to emulate customer service frames running on provisioned EVC's.

Figure 9:
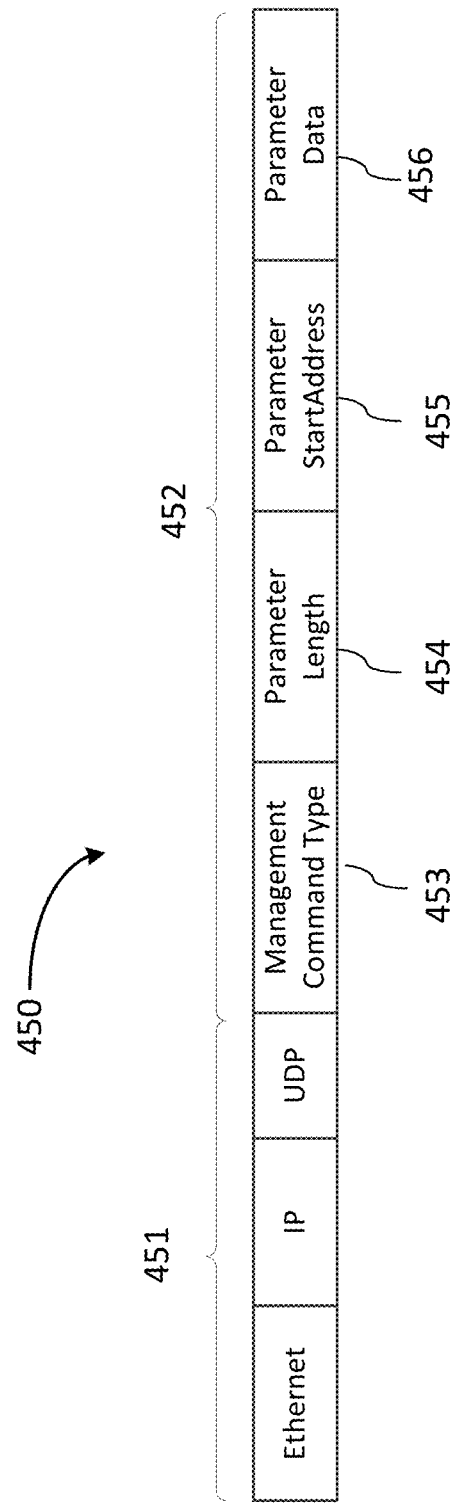
FIG. 9 is a schematic block diagram of a management frame.

With reference to FIG. 9, there is illustrated an exemplary management frame 450 that may be received by the PT 400 over the Ethernet, IP and UDP layers of the network. The management frame 450 is also referred to herein as a control frame. It includes a header 451 and a payload 452. In the illustrated embodiment the header 451 includes Ethernet (Layer 2), IP (Layer 3) and UDP (Layer 4) headers, but may include other headers as well. The payload 452 of the management frame 450 includes fields that contain information defining one or more management commands and related command parameters, that are used by the MPL 415 to set the test configuration parameters of the transceiver test logics. In the illustrated example these fields include a management command type field 453 which defines the command to be executed at the transceiver, a parameter length field 454 which defines the length of a test configuration parameter related to the command, a parameter Start Address field 455, which defines a pointer to an addressable memory space implemented in the transceiver 400, and a parameter data field 456, which defines the value of the parameter. A Command Multiplexer 434 of the MPL 415 illustrated in FIG. 10 uses the pointer to determine which bus read/write path is executed in the right side of FIG. 10 and initiates the transfer of the parameter data to that location.

Examples of the test configuration parameters include one or more network service parameters defining the network service to be tested and test control parameters. The test control parameters may in turn include one or more test frame generation parameters and statistics collection parameters.

When the management frame 450 enters the PT 400 via one of the physical interfaces 403, 407 in the upstream or downstream datapath, it is first detected as such by the filter logic 412, which parses its header and reads a pre-defined field to identify the frame as a management frame. This may be accomplished using a bit matching logic as described in the U.S. patent application Ser. No. 13/783,871. Once identified, the management frame payload, and optionally other frame-related information such as one or more relevant timestamps, is passed to the MPL 415.

Figure 10:
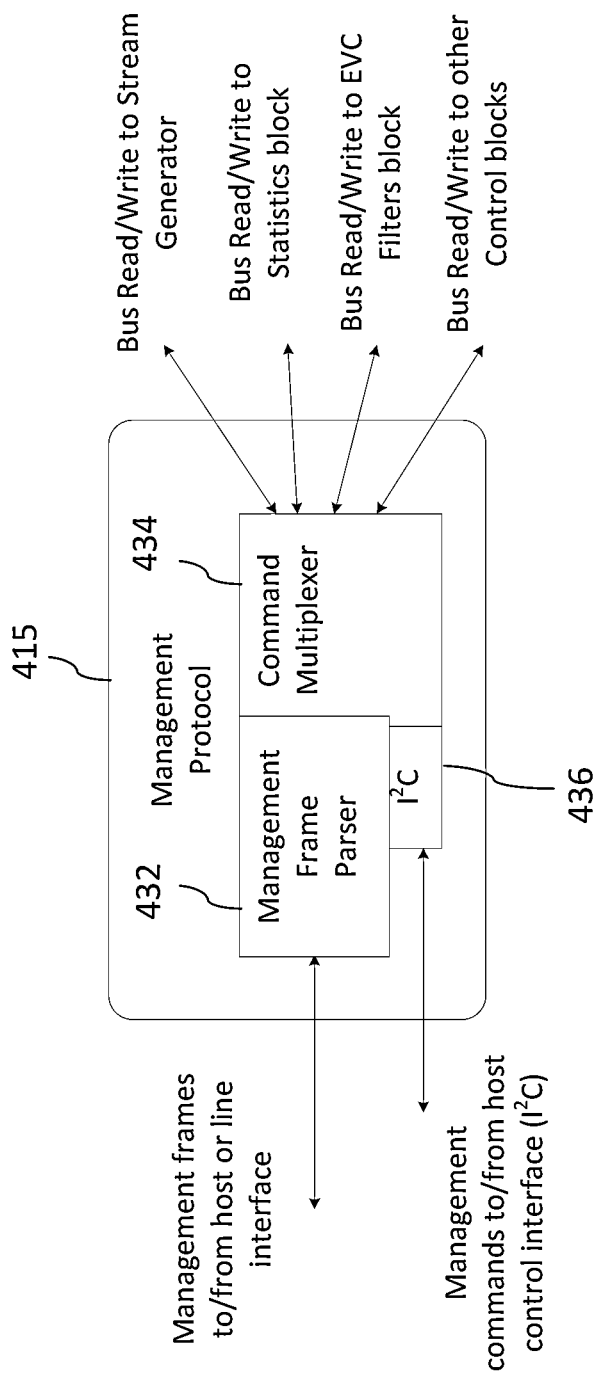
FIG. 10 is a schematic block diagram of a management protocol logic of the transceiver of FIG. 8.

Turning now to FIG. 10, there is illustrated an exemplary functional block diagram of the management protocol logic (MPL) 415. MPL 415 is operatively connected to the service filter logic 412 shown in FIG. 8 to exchange frame units or specific frame fields therewith, and may also be connected to a host controller interface such as I2C to receive and transmit management commands in embodiments wherein the host controller of the host NE implements an MF such as the mediation server 330. MPL 415 is a counterpart of the management protocol logic 333 of the MF 330 of FIG. 5, and is configured for receiving and parsing the test control commands that the management protocol logic of the MF 330 generates, and for extracting therefrom one or more network service parameters defining the network service to be tested and one or more test control parameters.

In the embodiment illustrated in FIG. 10, MPL 415 includes a management frame parser logic 432, a command multiplexer 434, and a host control interface converter 436 for converting from bus cycles of the host control interface for communicating management commands with the host controller (not shown) of the host NE. The management frame parser logic 432 connects to the host and line interfaces 403, 407 to receive therefrom management frames 450 generated at the MF, or their payload 452. In one embodiment the management frame parser 432 further includes logic for handling other frame-related information such as timestamps and sequence numbers, which may be then used as required, for example by the statistics logic 420. In one embodiment the management frame parser 432 further includes logic for building return management frames to transmit test results, confirmations, and the like back to the MF 233 or 300.

The management frame parser 432 receives the management frame payload 452, and parses it to extract the commands and command parameters as received in the pre-defined fields, and cooperates with the command multiplexer 434 to convert the content of the fields into bus cycles that drive the test configuration data into the internal blocks of the frame processing logic for storing. The bus cycles used by the MPL 415 may be similar to those used in typical logic designs.

The operation of the PT 400 or a variant thereof in a test system such as illustrated in FIGS. 4-6 will now be described by way of example with reference to executing a specific network test, such as that defined by the ITU-T standard Y.1564, which defines an out-of-service test methodology to assess the proper configuration and performance of an Ethernet service prior to customer notification and delivery. Key objectives of the Y.1564 test methodology are to serve as a network service level agreement (SLA) validation tool, ensuring that a service meets its guaranteed performance settings in a controlled test time, that all services carried by the network meet their SLA objectives at their maximum committed rate, and proving that under maximum load network devices and paths can support all the traffic as designed.

When the system user chooses to execute a test, such as Y.1564, or RFC-2544, he uses the central test server 210 to generate a corresponding test request and to communicate it to the MF 223 or 330. Upon receiving the network test request, MF 223 or 330 decomposes this request into a number of sub-tests directed to different PTs 122 or 400 in the network, depending on their location in the network, and selects test scripts suitable for each PT to be used in the test. For example, a first PT or a first group of PTs 122 may be designated to generate test streams and collect round-trip statistics, and a second PT 122 or a second group of PTs 122 may be designated by the MF 223 or 330 as 'partners' to loopback the generated streams or collect one-way statistics.

For example, the MF 223 or 330 may use the management protocol to generate commands to PT 400 to configure the stream/frame generating and processing logic 410, 412, 414, 418, with the anticipation that a remote test partner PT will either loopback the generated stream of frames for round-trip statistics analysis or the partner will initiate its own stream of frames toward the transceiver for calculation of one-way stream statistics. The central test server takes the system user request, which may include identification of specific network services to be tested and a set of test parameters, then passes this test request to the mediation function. The mediation function then selects specific test methods, algorithms and scripts for utilizing the frame processing logic of the transceivers to implement the algorithm behind the test request, in this example as defined by Y.1564 Standard.

Figure 11:
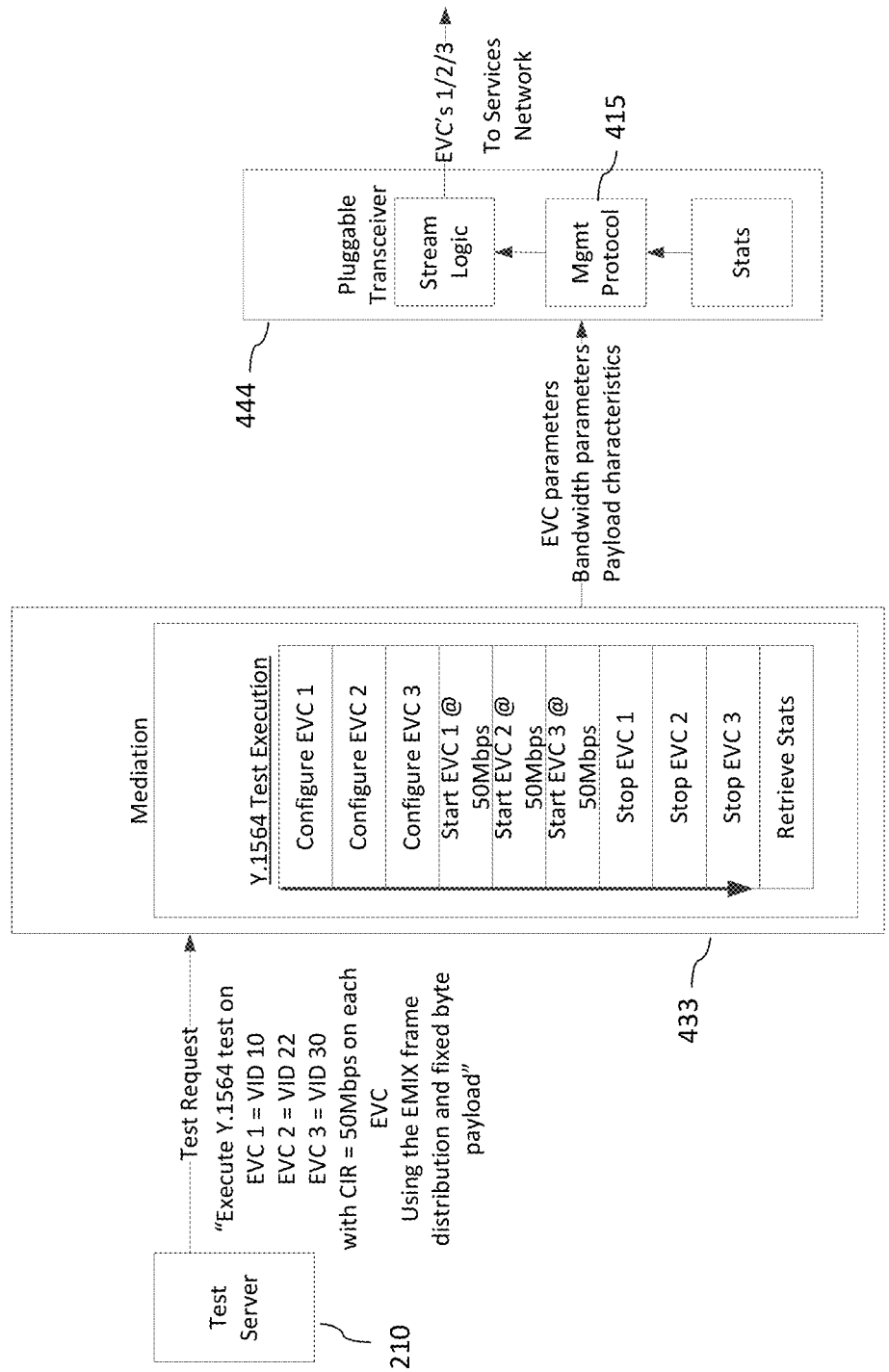
FIG. 11 is a logical diagram illustrating an exemplary test request execution by a network testing system.

Turning now to FIG. 11, there is illustrated an execution of an exemplary network test in accordance with an embodiment of the present invention. In the shown example, the user has selected 3 EVC's for testing, defined by their corresponding VLAN tag ID's (VID). Each of the EVC's is to be tested up to a CIR (Committed information rate) value of 50 Mbps while using a frame distribution defined by an EMIX (Ethernet Mix) configuration. The central test server 210 generates a corresponding test request in response to the system user input, which identifies the specific test to be performed, the network services EVC 1, EVC 2, and EVC 3 to be tested, and the test parameters, and communicates the network test request to a MF 433.

The mediation function 433 received the test requests, de-composes it in sub-test for specific PTs in the network, and for each sub-test executes a series of steps in a selected script to configure, start, stop and collect data about the EVC's under test. The required transceiver-executable commands for each of these scripted steps are issued to the pluggable transceiver 444, such as PT 122 or 400, to set the EVC parameters, bandwidth parameters and payload characteristics at the transceiver. The EVC parameters may include VLAN tag ID's, VLAN priority bits, or any other parameters defined by the MEF 10.2 specification, and may further optionally includes Layer 3 and higher service identifiers.

The bandwidth parameters may include fields to adjust internal parameters of the transceiver frame generation logic 410 that controls one or more Y.1564 defined bandwidth parameters, such as CIR, EIR (excess information rate), CBS (Committed Burst Size), and EBS (Excess Burst Size) (reference) of the test stream to be generated.

The commands and command parameters generated by the MF 330 may be communicated to the target PT using the host control interface such as I2C, or over the network in a management frame such as frame 450, as described hereinabove. In the illustrated example the MF executes a script that uses the management protocol to sequentially program the transceiver' filter and frame generation logics with the desired EVC parameters, to program the frame generation logic with the frame rate and payload parameters, to program the statistics block with the parameters related to the statistics collection, and to execute the frame generation and statistics collection for a desired time interval. More particularly, the MF 433 may sequentially send to the designated PT 444 a) commands to configure EVC 1, EVC 2, and EVC 3 at the transceiver for one or both the test frame generation and frame reception, b) commands to start the test stream generation for each of the configured EVCs at the specified rate, such as 50 Mbps in the illustrated example, using the EMIX frame distribution, and optionally to collect statistics from the loopback frames in the configured EVCs, c) commands to stop the test stream generation, and d) commands to retrieve the computed statistics.

In the transceiver these commands, and their related parameters, are parsed by the MPL 415, and forwarded to the corresponding filter, frame generation, and/or statistics collection logic 412, 410, 420.

Figure 12:
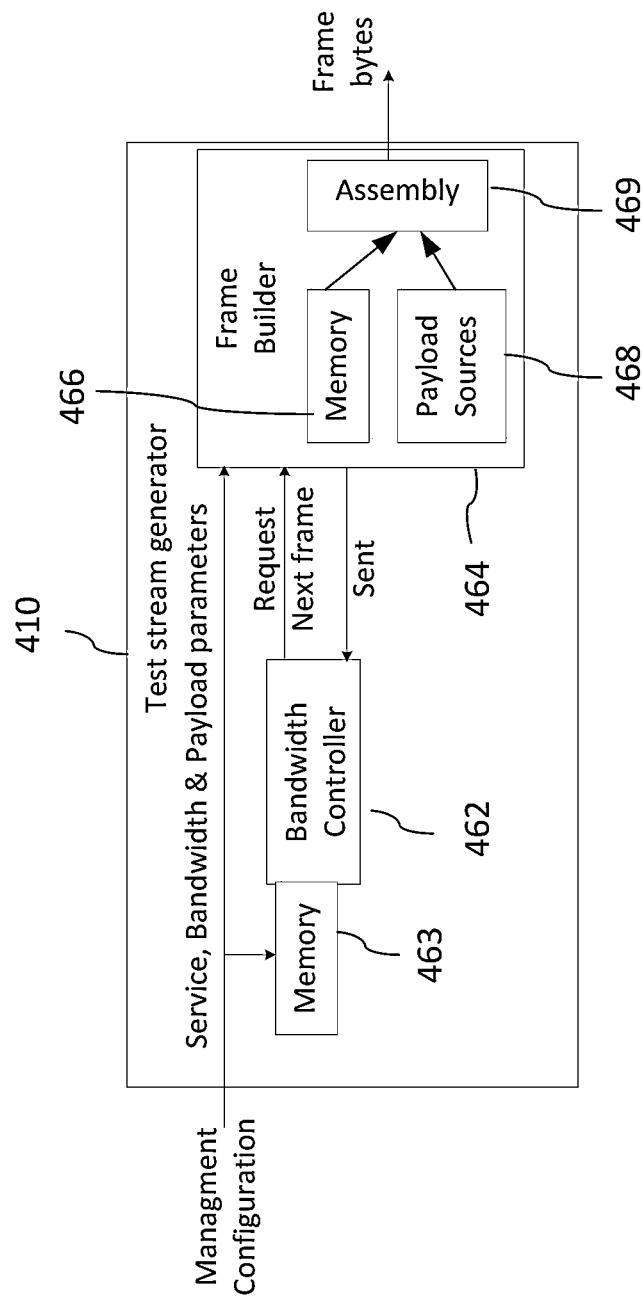
FIG. 12 is a schematic block diagram of a frame generation logic of the transceiver of FIG. 8.

To generate the desired test stream, the MPL 415 sends the received test frame related parameters, including the EVC parameters, to the test frame/stream generation logic 410, an embodiment of which is illustrated in FIG. 12, to configure it to generate the specified test frame stream.

Figure 13:
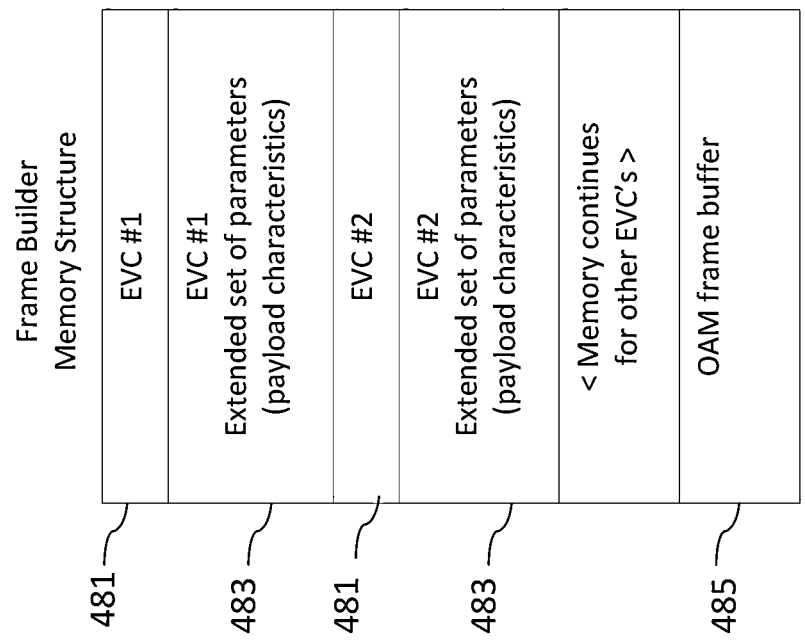
FIG. 13 is a logical diagram of the frame builder memory structure.

Referring now to FIG. 12, the test stream/frame generation logic 410 connects to the MPL 415 to receive its configuration parameters therefrom, which may include the network service parameters, such as but not exclusively EVC identifiers, and the frame generation parameters that may control the frame generation rate, frame size and frame payload type. As illustrated in FIG. 12, the frame generator logic 410 includes a bandwidth control logic 462, which controls the rate at which the test frames are generated and/or transmitted, and which has memory 463 associated therewith for storing the test configuration parameter(s) that control the frame rate, and a frame builder 464. The frame builder 464 in turn has a memory 466 associated therewith, a payload source 468 such as a payload generation logic, and a frame assembly logic 469, which is responsible for aligning the protocol layers, recalculating checksums, and outputting the frame bytes. The payload generation logic may include one or more bit or byte sequence generators to generate different types of payload as may be specified by the test request, such as a pseudo-random bit generator or repeated byte value generator for producing payloads wherein each byte has the same value as may be defined by the MF, or generators emulating other payload types for example as defined in various network test standards. FIG. 13 illustrates an exemplary logical structure of the frame builder memory 466, including one or more memory fields 481 for storing the service parameters such as the EVC identifiers, and one or more memory fields 483 for storing other test frame related parameters such as those defining payload characteristics. Memory 463 and 466, as well as other memories recited in this disclosure, may be in the form of register space addressable as memory and/or in the form of embedded RAM as known in the art, or using other known memory means that could be available at the PT.

In the example of FIG. 11, the test configuration parameters and commands that are provided to the test frame/stream generation logic 410 by the MF through the management protocol to configure it for the test include the EVC parameters specifying the selected EVCs 1, 2, 3, one or more bandwidth parameters, such as a 'NextFrame' timer that define test frame generation with CIR=50 Mbps, and parameters that calls for frame payload generation using the EMIX frame distribution and fixed byte payload as specified by the exemplary test request. In one embodiment, the one or more bandwidth—related parameters may be repeatedly changed by the MF through the management protocol to determine a maximum error-free rate, as described hereinabove with reference to the RFC-2544 testing.

To collect the desired EVC statistics, the MPL 415 sends the received EVC parameters to one or both of the filter logics 412 to configure therein the specified number of EVC filters to identify received Ethernet frames of the specified EVCs, in this example EVC 1, EVC 2 and EVC 3 and decide whether to mark them for additional processing or to pass through.

Figure 14:
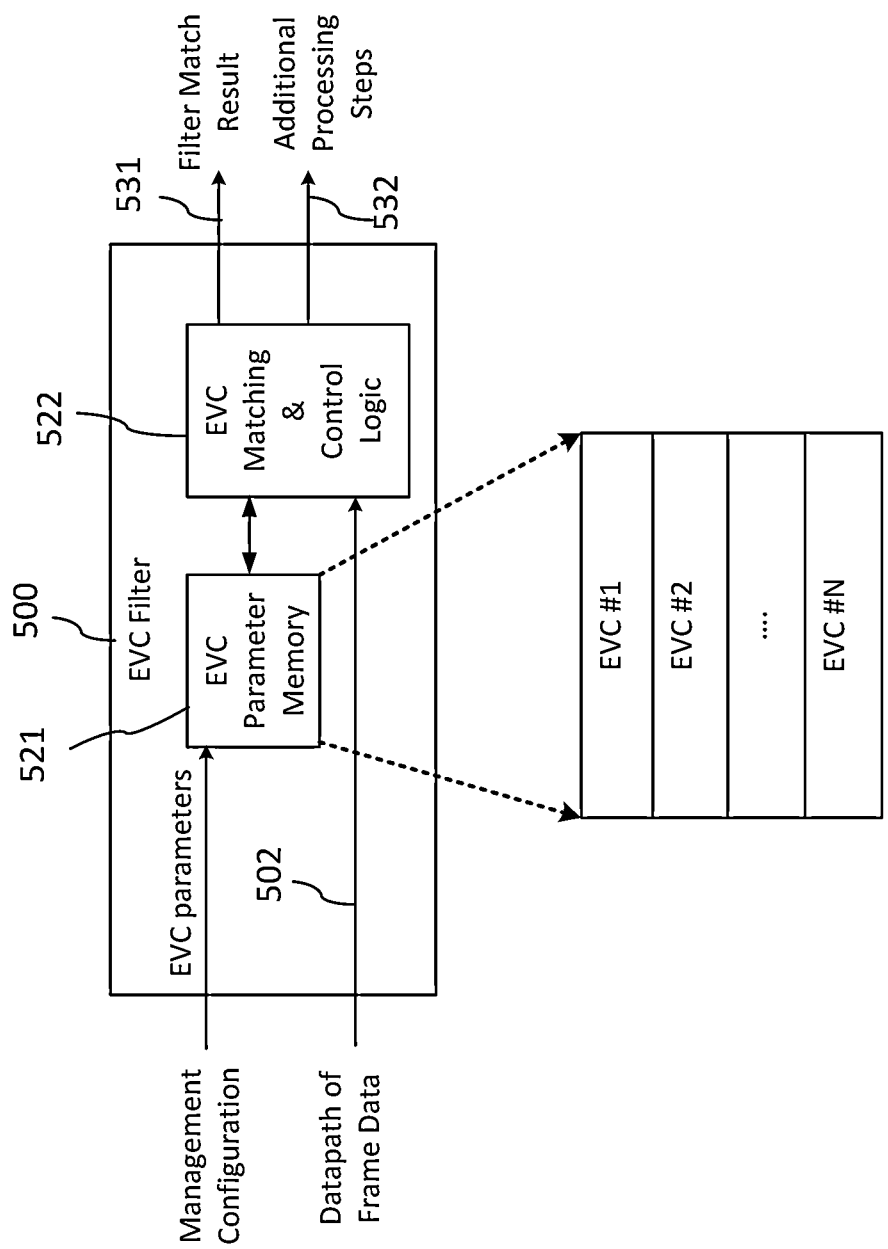
FIG. 14 is a schematic block diagram of an EVC filter logic.

With reference to FIG. 14, there is illustrated an exemplary functional diagram of an EVC filter 500, which may be configured within the filter logic 44 to implement the network service filter 412, and which includes a service parameter memory 521 for storing the received service parameters, and a service matching and control logic 522. In the instant embodiment, wherein the services to be tested are or related to EVCs, these logic units are also referred as the EVC parameter memory 521 and the EVC matching and control logic 522. The EVC matching and control logic 522 is programmed to output filter match result 531 indicating whether EVC parameters of the received frame match the EVC parameters of the EVC 1, EVC 2, or EVC 3 that are programmed into the EVC memory 521 by the MF through the management protocol, selectively choose additional processing steps which may include frame forwarding into the EVC forwarding FIFO, frame forwarding into the EVC Loopback FIFO, which may include additional processing such as address swapping, timestamping, checksum recalculation, insertion of counter, status bits, device ID and the like as required, frame forwarding into the statistics collection logic 420, and frame termination using a frame killer (FK) logic. In one embodiment, the EVC matching and control logic 522 may include frame marker logic, bit matchers logic, and FIFO write control logic that operate substantially as described in the U.S. patent application Ser. No. 13/783,871.

The FK logic 418 provides the frame killer feature that instructs the EVC forwarding FIFO 416 and/or Loopback FIFO's 422 to drop the incoming frames based on the identification of EVC filter matches, additional processing steps from the EVC filter, and the identification of management frames by the frame parser. Terminated frames are dropped from the FIFO to prevent them from passing outside of the transceiver and into the next network segment where they have the potential to disrupt customer services traffic. Frames belonging to the provisioned EVC's carrying customer services traffic and not terminated by the transceiver frame processing logic will pass through the device unimpeded by utilizing the available forwarding FIFO's. Test scenarios involving the use of latching loopbacks or other responder modes of PT operation, such as Ethernet Service OAM testing can also be provisioned by the MF and will force frames to use the loopback FIFO's as described in the U.S. patent application Ser. No. 13/783,871.

The test logic components of the PT 400 for stream generating, filtering, and statistics collection described hereinabove can also be programmed to encompass more advanced feature sets at OSI layers 3, 4, and above. As the protocol layer to be tested becomes more complicated, the logic in the Frame Builder and EVC Filter blocks 464, 500 is adapted to meet the test frame construction, matching, and terminating needs of the new test parameters. For instance, if the user requests a Layer 3 IP version of the Y.1564 test over a defined set of EVC's, then the EVC test parameters are expanded to account for IP addresses, IP DSCP (Differentiated services Code Point) bits, ToS (type of service) bits, or other fields relevant to the creation of IP stream frames as known in the art. The test scenarios are easily extended to higher layers to support UDP, TCP and other protocols by corresponding extensions to the mediation function script, transceiver frame processing logic and the test parameters passed between them to communicate the necessary protocol fields used in the construction of the frame by the frame builder 464.

Figure 15:
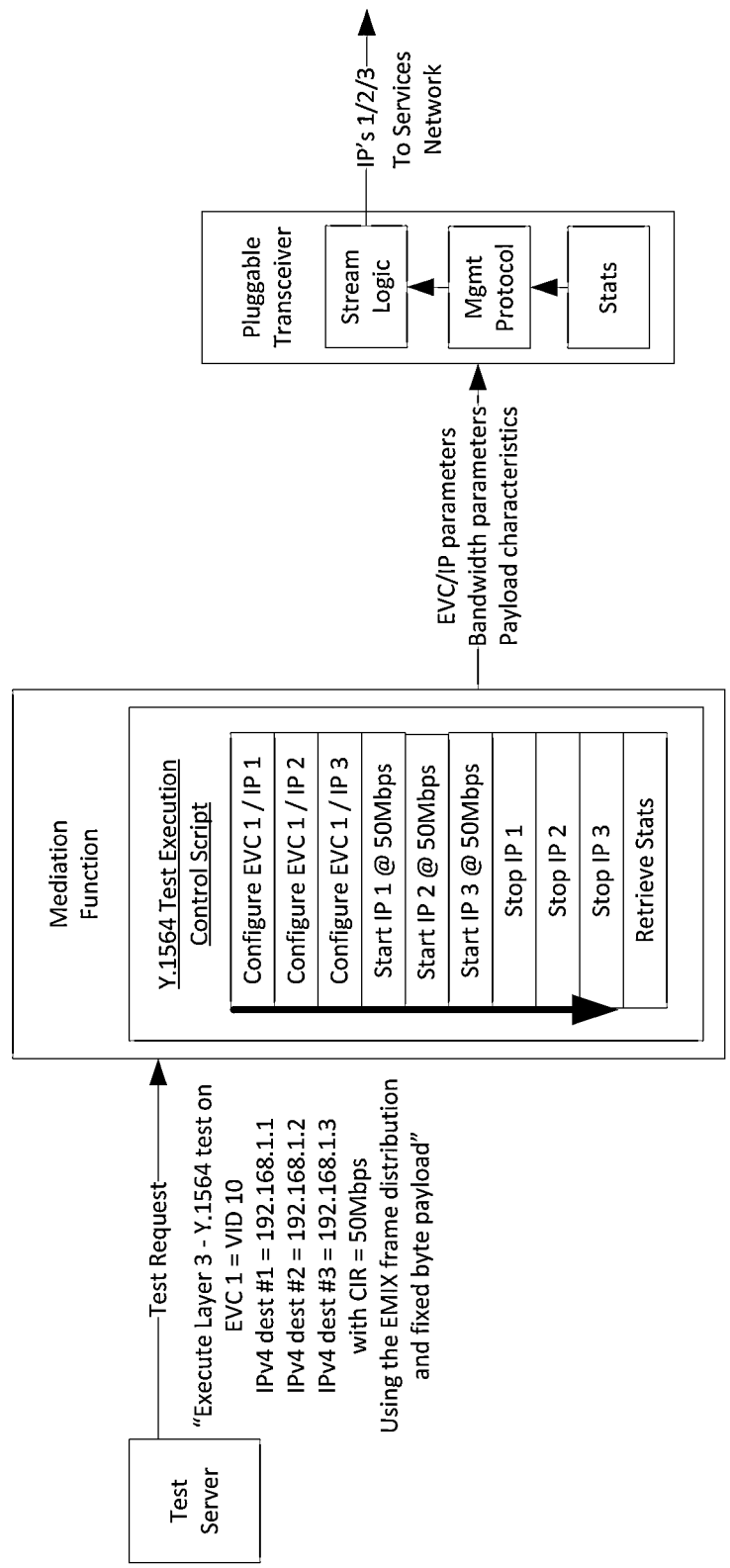
FIG. 15 is a logical diagram illustrating an exemplary test request execution for testing Layer 2 and 3 services by a network testing system.

By way of example, FIG. 15 illustrates an extension of the network test example of FIG. 11 to Layer 3 IPv4. In the example shown in FIG. 15, the user has selected for testing Layer 3 network services to three different IPv4 destination addresses over EVC #1, which is identified by its VID field.

The service is to be tested up to a CIR value of 50 Mbps while using a frame distribution defined by an EMIX (Ethernet Mix) configuration with fixed byte payload. The central test server 210 generates a corresponding test request in response to the system user input, which identifies the specific test to be performed, three sets of the network service parameters EVC 1/IP 1, EVC 1/IP 2, and EVC 1/IP 3 to be tested, and the test parameters, and communicates the network test request to the MF. The mediation function 433 executed the corresponding test script, in which it sends the EVC/IP parameters and other test configuration parameters to one or more designated PT.

In the transceiver these commands, and their related parameters, are parsed by the MPL 415, which is now configured to recognize commands and parameters related to Level 3 IPv4 services, such as IPv4 header fields, and forwarded to the corresponding filter, frame generation, and/or statistics collection logic.

Figure 16:
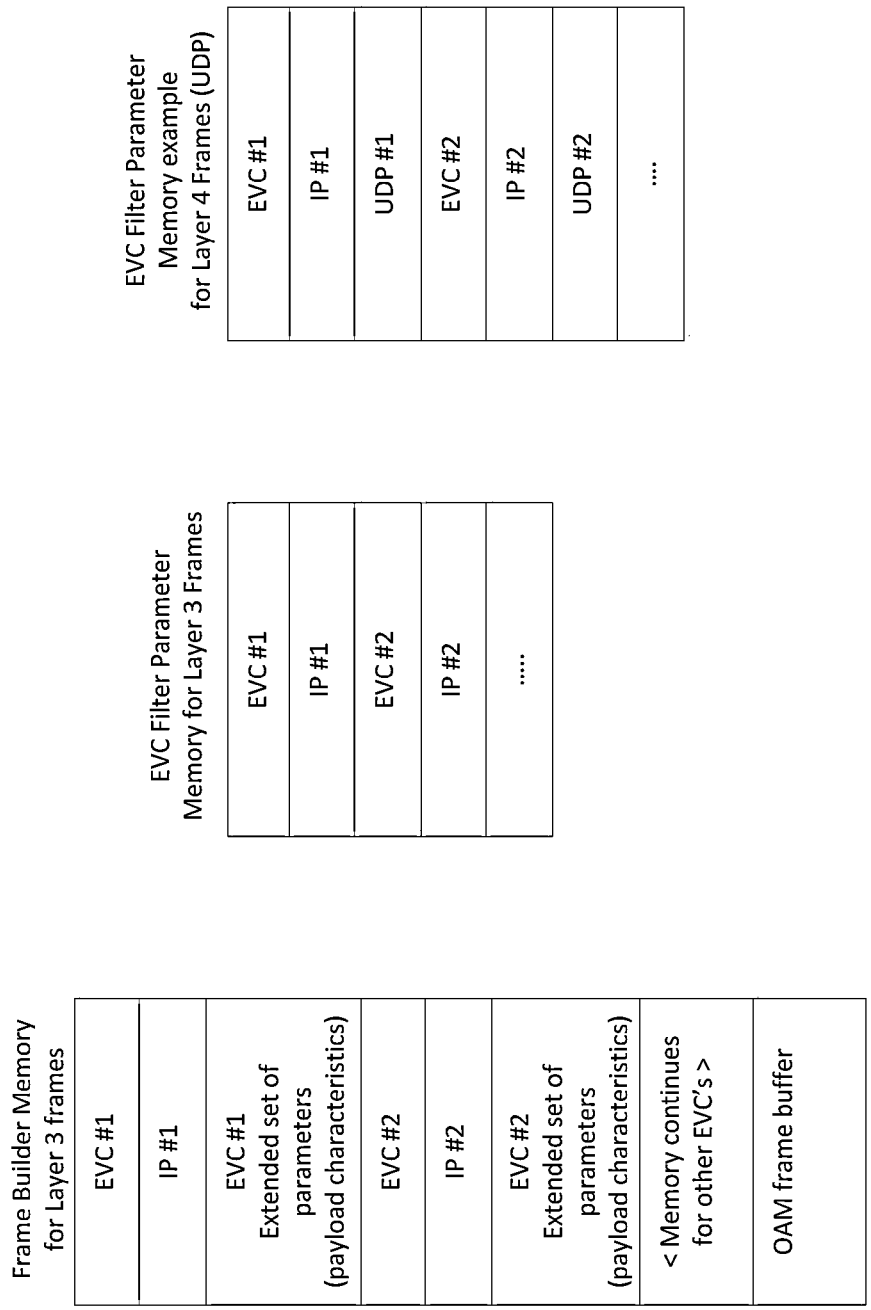
FIG. 16 are exemplary diagrams of the logical structure of the frame builder memory and EVC memory for Layer 2, 3 and 4 services testing.

Referring to FIG. 16, it illustrates exemplary structures of the frame builder memory and EVC filter memory that are extended to Layer 3 frames to include memory sections for storing IP addresses, and an exemplary structure of the EVC parameter memory that is extended for Layer 4 frames to include UDP addresses/ports numbers.

Figure 17:
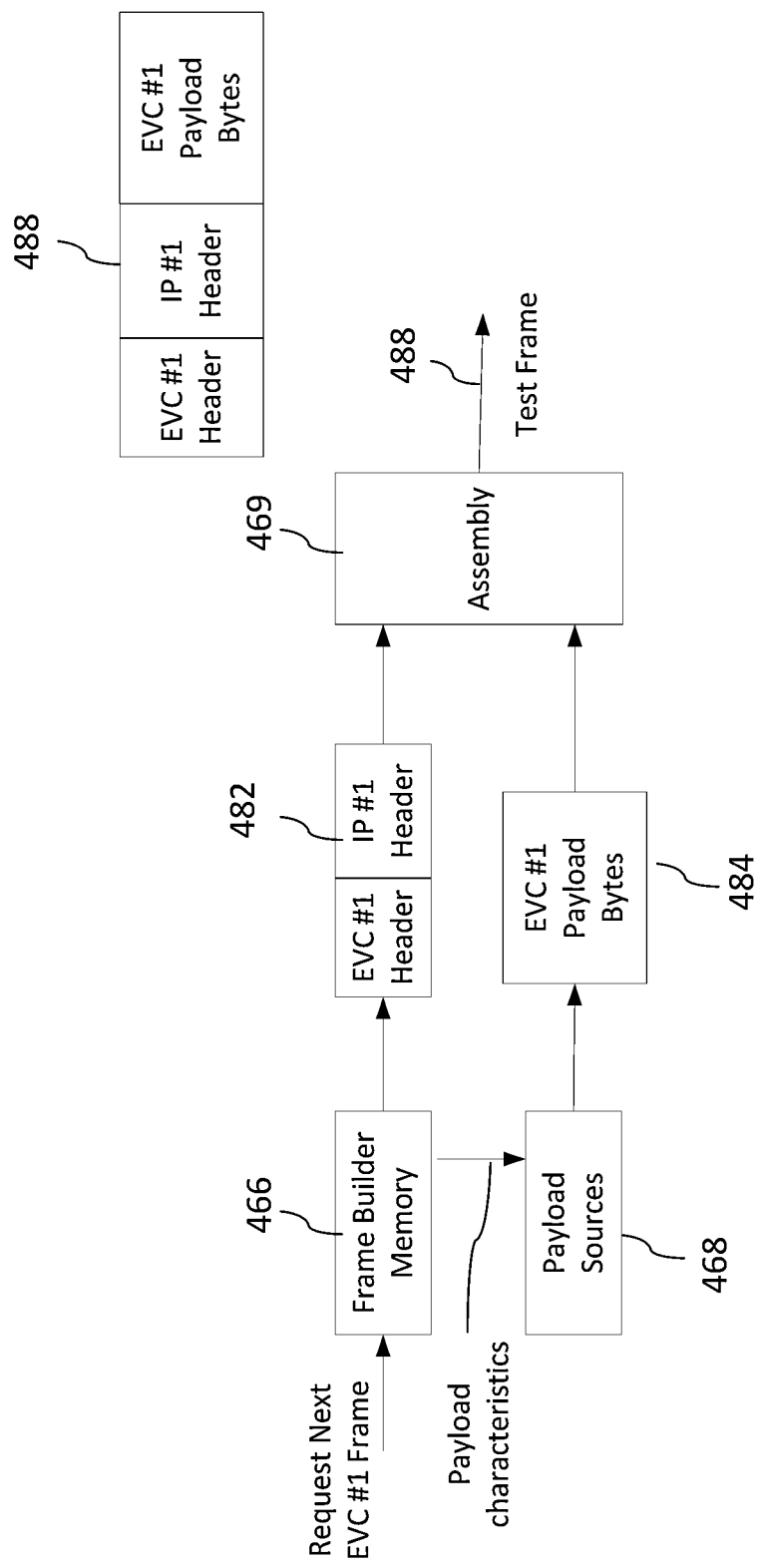
FIG. 17 is a schematic diagram illustrating the process of frame building for testing Layer 2 (EVC) and 3 (IPv4) services.

Referring to FIG. 17, there is illustrated the operation of the frame builder logic (FBL) 464 of PT 400, 122, or 444 in the test stream/frame generator 410 in response to receiving the command to generate Level 3 test frames for the specified EVC/IP service having the service parameters defining EVC 1 and IP 1. The shown operation starts after the MF programs the service parameters, the payload characteristics parameters and the frame rate parameters into the frame builder memory using the management protocol and the MPL 415, and after receiving the command to start the test stream generation for the EVC 1/IP 1 service.

Upon receiving a 'Next Frame' request from the bandwidth controller 462, FBL 464 reads the service parameters for the service from the memory 466, and generates the EVC #1 and IP #1 headers 482, in this examples—having the specified VID and IPv4 destination address. The bandwidth controller 462 is configured to have the ability to vary the rate at which frames are requested per generated stream as defined by the frame rate related parameters provided by the MF, for example using industry standard and other known prior art methods involving accumulators, timers and control protocol mechanisms to meet the test requirements to emulate customer service traffic.

FBL 464 also reads the payload related parameters that define the desired payload characteristics—in this example the EMIX frame distribution and fixed byte payload—and selects and runs a corresponding payload generator from the payload sources 468 to generate payload bytes 484, for example by executing one of pre-configured scripts. The frame assembly logic 469 then assembles the headers 482 and the payload bytes 484 into a test frame 488, which is then sent to a specified datapath interface for transmitting to the destination device in the network, in this example as defined by the destination IP address.

At the destination device, which can be for example another NE in the network being tested, the test packet 488 is received by another PT 122 or 400, which in one embodiment and by way of example has been pre-configured by the MF 223 to loop back the test frames of the specified EVC/IP service, such as for example described in the U.S. patent application Ser. No. 13/783,871. The looped back test frames are then received at the PT 400 where they were generated, where they are processed using the pre-configured EVC filter, which passes specified frame fields and the other frame-related information, as defined by the received statistics collection commands and parameters of the management protocol, to the statistics logic 420.

Figure 18:
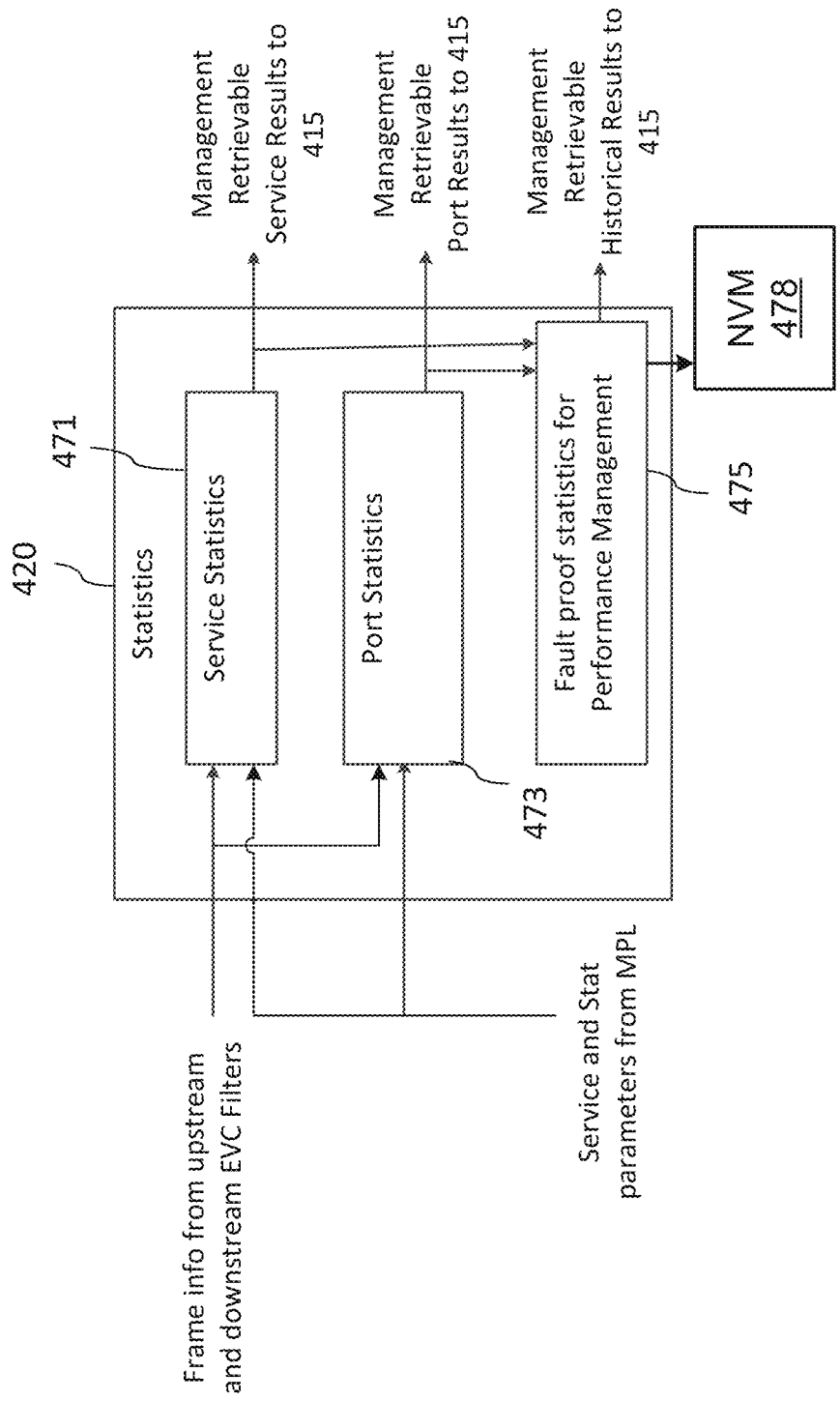
FIG. 18 is a schematic block diagram of a statistics logic of the transceiver of FIG. 8.

With reference to FIG. 18, there is illustrated a functional block diagram of the statistics logic 420. This logic block includes a service statistics block 471 and a port statistic block 473, each of which connect to the MPL 415 to receive therefrom those of the configuration parameters that relate to service statistics collection, which may include the network service parameters, such as but not exclusively EVC identifiers, and parameters specifying the statistics to collect. Each of the service statistics and port statistics blocks 471, 473 also connect to one or both of the upstream and downstream filters 412 to receive therefrom the frame-related information that is required to generate the requested statistics, such as the EVC filter match results indicating to which of the designated EVC and, if specified, IP streams a particular received frame belongs, system timestamps indicating the system time on frame arrival, frame timestamps which may be embedded into the frame at frame transmission or loopback, frame sequence numbers and the like as may be required by the test request and as may be specified by the MF. Separate statistics may be kept for each of the designated network services, e.g. EVC's, that the EVC filter logic has been configured to identify, as well as statistics for each port. Here, the term 'port' relates to 'receive' datapath ports of the line and host interfaces 403, 407, which in one embodiment include an optical port and an electrical data port.

The statistics generation blocks 471, 473 may be configured to use both industry standard statistics collection algorithms, such as those defined in MEF 35, RFC-2819 and other related RMON standards, and others, as well as proprietary algorithms as defined by the test system operator, to calculate the results. Example statistics include frame counts, frame delay, inter-frame delay variation and frame loss, each capable of being computed from embedded fields within the frame along with running counters and timestamps within the transceiver. Other examples of statistics that may be generated include status indicators and alarms as known in the art. Each set of results may be retrieved by the mediation function through the MPL 415 using the management protocol.

The statistics logic block 420 may further optionally include a fault-proof statistics collection logic (FPSC) 475, which enables fault-proof statistics collection by storing historical records of the statistics generated by 471, 473 in non-volatile memory 478. In the event of a fault, such as power failure or lost management protocol capability from the mediation function, the fault proof statistics that have been stored may be collected at a later time when the fault condition has cleared. Constant connection to the mediation function is not required for the successful creation of result sets, which leads to a more fault tolerant system.

In one embodiment, the FPSC logic 475 saves statistics results in sets collected during a programmable time period for a selected rollover time, with the size of the results set, the programmable timer period and the quantity of periods requested before the rollover determining the amount of non-volatile memory 478 and how the memory is segmented to hold the results. For example, if the test configuration parameters set the timer period to 5 minutes and the rollover period for 24 hours, then 288 sets of results will be stored in memory 478 and then retrieved through the management protocol. After each 5 minute period, the write pointer into the memory is advanced to the next results set location determined by the present write results pointer plus the size of the past period's results set. When the management protocol requests retrieval of stored results, a separate read results pointer is used to retrieve the requested period's set of results and returned to the mediation function. The mediation function uses a command defined in the management protocol to retrieve the available sets of results, and then aggregates them for historical reporting or forwards to the central server.

In accordance with an aspect of the present invention, embodiments of the network test system and method of the present disclosure may also include means to support one or more industry standard or proprietary Ethernet OAM (Operations, Administration and Maintenance) protocols for interoperating with other NEs or other PTs in the network during testing, such as but not exclusively, latching loop-up commands, and Y.1731 Service OAM messages for configuring and testing to a remote network device as a "partner" in the test. In particular, one embodiment of the method and system of the present disclosure includes the use by the mediation function of a pluggable transceiver associated therewith to communicate OAM information to network devices, such as remote NEs or other PTs installed therein, with which the mediation function cannot communicate directly.

Turning back to FIGS. 5 and 13, one embodiment of the mediation function 223 or 330 includes OAM logic 338 for generating OAM control information, which at the request of the test script execution logic 332 is communicated using the management protocol to one or more of the PTs 122 or 400 in the network for transmitting to one or more destinations NEs or to other PTs 122 or 400 in the network. The OAM control information may include one or more OAM protocol commands and one or more destination device identifiers such as network address. In this embodiment the pluggable transceiver 400 or 444 also provides an OAM memory 485 and an associated frame assembly logic within the frame builder 410 for building OAM frames. The mediation function communicates the OAM information and the destination device address through the management protocol to the frame builder memory 485 in order for the transceiver to transmit it to the designated network device in the network. The OAM-related frame builder logic may then transmit the frame content in OAM memory to the network as delivered from the mediation function or, if the mediation function communicated only the command payload data, the frame builder may prepend a frame header to the command using a configured set of extended EVC parameters retrieved from the frame builder memory. Examples of remote partners for interoperability include network switches, NID's, network probes and test sets, or a second test-capable pluggable transceiver. This process provides interoperability capabilities that include, but are not limited to, the use of remote device discovery, remote results retrieval and issuing latching loopback commands on a per-port or per-EVC basis.

In one embodiment, the method, system and transceiver of the present disclosure extend Layer 2 Ethernet Service OAM testing and involves the use of a logical entity MEP (Maintenance association End Point) or MIP (Maintenance domain Intermediate Point), for example as defined in industry standard MEF 6. In one embodiment MEP testing is supported by using an expansion of the EVC test parameters to include additional fields to describe the MEP and its involvement in a Maintenance Entity Group (MEG). These fields include identifiers for the MEG ID, MEG Level, and MEP ID as well as frame generation intervals required by the results algorithms for each type of frame in use (CCM, DMM, SLM, etc.) as defined in Y.1731, MEF 20, and MEF 35.

Figure 19:
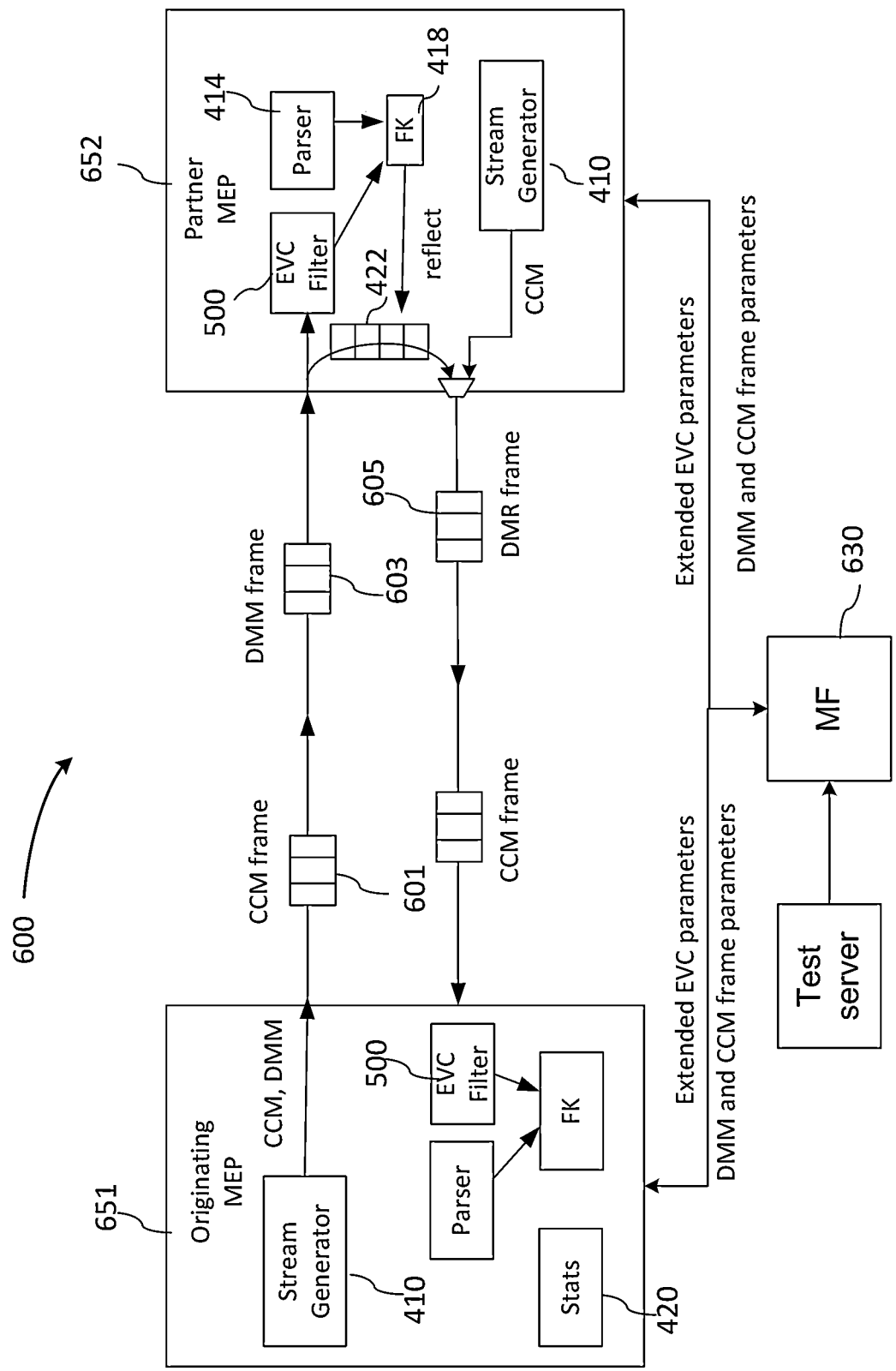
FIG. 19 is a schematic diagram illustrating an exemplary system for Layer 2 Service OAM testing using MEP.

With reference to FIG. 19, in one exemplary scenario the user of a network test system 600 may want to initiate a test of the layer 2 network service by configuring an embodiment of PT 400 as the originating MEP 651 to join a MEG with CCM continuity checking enabled. The user may also add to the test request a measurement of a network frame delay by using the PT 651, to generate and send frames containing DMM messages at a rate of, for example, 10 frames per second. The extended set of EVC parameters, which MF 630 will send to the originating MEP PT 651 to support this type of test, may include the EVC identifier, MEG ID, MEG Level, MEP ID and a MAC address for a partner MEP 652, which will be the network destination for the delay-measuring DMM frames, and which may be embodied as a second instance of PT 400. Each of these extended EVC parameters is configured into the EVC filters block of the MEP PT 651 by the mediation function 630 to match frames belonging to the network service. The Frame Builder memory of the stream generator logic 410 is also given the same parameters to construct the DMM frames 603. Additionally, the frame interval values for the CCM and DMM frames are programmed by the MF 630 into the bandwidth controller of the stream generator 410 to set the quantity of frames generated per second.

When the stream generator 410 is started, the Frame Builder constructs and transmits frames 601, 603 for the CCM message and the DMM message containing a transmit timestamp. After the DMM frame 603 traverses the network service to the partner MEP PT 652, it is reflected back to the originating MEP PT 651 in the form of a DMR message frame 605. When the DMR message frame 605 has returned to the originating MEP 651, the frame is matched by the EVC Filter block 500, a receive timestamp is assigned to the frame and the Statistics block 420 is alerted to update the results. The round-trip delay is then computed by the statistics block 420 from the received and transmitted timestamps by subtraction. It will be appreciated that a similar test can be performed with SLM messages (which contain sequence numbers) for measuring frame loss, and the test procedure can be easily adopted to measure single-ended delay and loss as defined in the industry standards.

The MF 630 may be embodied for example as illustrated in FIG. 5 and may be used to configure two instances of PT 400 to implement the originating MEP 651 and the partner MEP 652. To configure an instance of PT 400 as the partner MEP 652, the MF sends the extended set of EVC parameters to be programmed into the EVC filters 500 and stream generator 410 thereof. The bandwidth controller of the stream generator 4102 may only be configured for the CCM messages and will wait to receive DMM frames 603. DMM frames 603 are recognized in the frame parser 414 for example by their opcode defined in the Y.1731 specification, and in combination with the EVC Filter match result represent an indication for the Frame Killer 418 to mark the frame for reflection onto the network back to the originating MEP by way of EVC Loopback FIFO 422. Reflection of the frame takes advantage of internal features of the EVC Loopback FIFO 422, which includes logic for swapping data fields and insertion of new data fields, such as timestamps and sequence numbers. The manipulation of the data fields, including the message opcode change from DMM to DMR type, are well defined in the Y.1731 specification.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

For example in some embodiments, one or both of the two latching loopback logic blocks and/or the statistics block may be omitted. For example although this is less than ideal, it is possible for a transceiver to include filter and/or LLB logic that filters only one datapath, forwards on that data path and loopbacks on the other data path while packets on the other data path are not filtered or looped back. It is also possible for one of the transceivers to generate but do not filter test frames or collect statistics on them, and use another transceiver to perform those test stream analysis functions.

Where the present disclosure has provided description and examples in the context of network services testing and Ethernet frames, the present disclosure is readily adapted to higher layer data including IP packets (layer 3), segments or datagrams (layer 4) and data at higher layers. The filter logic would also include provisioned matching logic for these types of higher level data. For example, transport testing at Layer 4 may also be supported by the transceivers 122, 400, and 444 in order to cover TCP and UDP based applications. Test frame generation logic of the pluggable transceiver of the present disclosure may be configured to generate streams of TCP or UDP frames using stateless connection configurations or by the use of TCP throughput qualification tests such as RFC-6349 and the JDSU branded Truespeed™ test. This type of testing helps to discover the true performance of the network for modern web enabled applications. Any number of these and other testing capabilities, including but not limited to stream generation, termination, monitoring or latching loopback, may be operational in a given transceiver in the network by deploying them from a unified management system, for example using the mediation function. Test capabilities of the transceiver's internal logic can also be reloaded between tests as part of a strategy to accomplish a wide range of tests that wouldn't otherwise be able to fit into the transceivers test logic simultaneously. Implemented through partial reconfiguration methods, the reload of the test logic modules into the transceiver's PLA can also be applied in a manner that utilizes bypass datapaths such that the active network services are not disrupted while the test capabilities are installed, for example as described in U.S. patent application Ser. No. 13/850,422, which is incorporated herein by reference.

Where any claim enumerates elements or actions (alphabetically, numerically or otherwise), these enumerations are provided for identification purposes only and do not imply any order of actions. The order of actions in a claim having enumerated actions (alphabetically, numerically, or otherwise) is determined by the language of the claims as informed by the specification, and not by the enumeration order of those actions.

We claim:

1. A method for performing network measurements in an Ethernet network comprising a plurality of network elements (NE), the method comprising:
   a) providing a central test server;
   b) providing a pluggable transceiver (PT) connected at one of the plurality of NEs for receiving and transmitting network traffic, the pluggable transceiver comprising a programmable logic array containing a test logic module;

c) providing a mediation sub-system in communication with the central test server and the PT, the mediation sub-system comprising logic for generating transceiver-executable commands and for communicating said commands to the pluggable transceiver in response to receiving test requests;

d) using the central test server to generate a test request and to communicate the test request to the mediation sub-system;

e) using the mediation sub-system to translate the test request into a plurality of subtests, including adjusting a frame rate generation of the PT, to generate a sequence of transceiver-executable commands to execute the plurality of subtests, and to communicate said commands to the PT to execute the plurality of subtests;

f) receiving, at the PT, the sequence of transceiver-executable commands, and storing network service parameters for the commands in memory; and, g) using the test logic module of the PT to execute the received transceiver-executable commands to perform a network test.

2. The method of claim 1, wherein the PT comprises a filter logic for filtering frames received from the network, and wherein step (g) comprises:
g1) configuring the filter logic to select, among frames received in operation by the PT from the network, service frames related to the network service to be tested;
g2) collecting statistics on the selected service frames as defined by the transceiver-executable commands received from the mediation sub-system; and,
g3) communicating the statistics to the mediation sub-system for aggregation and for communicating to the central test server.

3. The method of claim 2, wherein step (g) further comprises temporarily storing the statistics in non-volatile memory for preventing a loss thereof in case of a communication failure between the PT and the mediation sub-system.

4. The method of claim 1, wherein step (g) comprises generating and transmitting test frames for the selected network service according to the received transceiver-executable commands.

5. The method of claim 4, comprising generating the test frames at a varying frame rate and/or with a varying payload as defined by the received transceiver-executable commands.

6. The method of claim 1, wherein:
step (e) comprises using the mediation sub-system to generate one or more OAM protocol commands for transmitting to a remote network device for configuring thereof in accordance with the test request; and,
step (g) comprises using the pluggable transceiver for generating one or more OAM frames containing the one or more OAM protocol commands received from the mediation function, and transmitting said one or more OAM frames to the remote network device.

7. The method of claim 1 wherein the network service to be tested comprises an Ethernet virtual circuit (EVC), and the one or more network service parameters comprise one or more EVC parameters defining the EVC to be tested.

8. The method of claim 1 wherein the network service to be tested comprises a Layer 3 IP service, and the one or more network service parameters comprise one or more IP header parameters defining the IP service to be tested.

9. The method of claim 4 wherein step (e) comprises selecting and executing a test script corresponding to the received test request, wherein the selected test script includes generating a command to change a test parameter at the PT.

10. A system for performing network measurements in an Ethernet network comprising a plurality of network elements (NE), the system comprising:
a plurality of pluggable transceivers (PT) installed at the plurality of NEs for receiving and transmitting network traffic;
a central test server for generating a network test request and for collecting test results; and,
a mediation sub-system in communication with the central test server and the plurality of the pluggable transceivers for receiving the network test request from the central test server, for translating said request into a plurality of subtests, including adjusting a frame rate generation of the PT, for generating a sequence of transceiver-executable commands to execute the plurality of subtests, and for communicating said commands to the pluggable transceivers for executing the plurality of sub-tests;
wherein each pluggable transceiver comprises a programmable logic array containing a test logic for executing the transceiver-executable test commands.

11. The system of claim 10, wherein the test logic comprises at least one of a test frame generation logic and a service statistics generation logic, and a network service memory for storing one or more network service parameters identifying a network service to be tested.

12. The system of claim 10, wherein the mediation sub-system comprises at least one of:
a stand-alone communication server connected to the network for communicating the transceiver-executable commands to the plurality of PTs over the Ethernet network using a common management protocol, and
an embedded mediation server residing at one of the NEs for communicating the transceiver-executable commands to one or more pluggable transceivers installed at said NE, wherein said NE comprises a processor, and wherein the embedded mediation server comprises a processor-readable memory coupled to the processor and containing processor executable instructions for generating the transceiver-executable commands in response to receiving the test request or a request originated therefrom.

13. The system of claim 10, wherein the mediation sub-system comprises a memory for storing a plurality of test scripts, and a script-selecting logic for selecting one or more of the test scripts for generating the sequence of the transceiver-executable commands in response to receiving the test request.

14. The system of claim 11, wherein the mediation sub-system comprises logic for generating OAM control information for communicating to one of the PTs for transmitting to a remote network device.

15. The system of claim 11 wherein the network service to be tested comprises an Ethernet virtual circuit (EVC), and the one or more network service parameters comprise one or more EVC parameters defining the EVC to be tested.

16. The system of claim 11 wherein the network service to be tested comprises a layer 3 IP service, and the one or more network service parameters comprise one or more IP header parameters defining the IP service to be tested.

17. A pluggable transceiver for use in a network element of an Ethernet network for performing network measurements and for receiving and transmitting network data, the transceiver comprising:
- a downstream datapath for relaying frames downstream through the transceiver;
- an upstream datapath for relaying frames upstream through the transceiver;
- a host controller interface;
- a programmable logic array disposed in the upstream and downstream datapaths and comprising:
  - a filter logic for detecting management frames received by the transceiver in at least one of the upstream and downstream datapaths;
  - a management protocol logic (MPL) operatively connected to the filter logic and the host controller interface and configured for receiving and parsing test control commands instructing the pluggable transceiver to perform a plurality of subtests including adjusting a frame rate generation of the pluggable transceiver, wherein the commands are contained in the management frames or received over the host controller interface;
  - a network service memory for storing the one or more network service parameters; and,
  - programmable test logic (PTL) operatively connected to the management protocol logic for communicating therewith and comprising at least one of a test frame generation logic and a service statistics generation logic to perform the plurality of subtests.

18. The transceiver of claim 17 wherein the network service to be tested comprises an Ethernet virtual circuit (EVC), and the one or more network service parameters comprises one or more EVC parameters defining the EVC.

19. The transceiver of claim 17 wherein the PTL comprises the test frame generation logic operatively connected to the network service memory for generating test frames for the network service to be tested in accordance with the one or more test parameters.

20. The transceiver of claim 19, wherein:
the MPL is configured to extract, from the received test control commands, one or more test frame generation parameters defining at least one of: a test frame payload size, a test frame payload characteristic, and a test frame transmission rate, and to communicate said one or more test frame generation parameters to the test frame generation logic; and, the test frame generation logic comprises:
- a frame builder for assembling the test frames according to the frame test generation parameters, and
- a bandwidth controller configured to control a frame rate at which the test frames are sent along the downstream or upstream path according to the test frame generation parameters.

21. The transceiver of claim 20, wherein:
the MPL is configured to extract, from the received test control commands, one or more OAM protocol commands, and to communicate said OAM protocol commands to the test frame generation logic; and,
the frame builder is configured for assembling OAM control frames comprising the OAM protocol commands for transmitting to a remote NE or a remote pluggable transceiver in the network over one of the upstream and downstream data paths.

22. The transceiver of claim 17 wherein the PTL comprises
the statistics generation logic operatively connected to the filter logic for collecting statistics on the service to be tested or for generating port-related statistics as defined by the transceiver-executable commands; and,
wherein the filter logic further comprises a service filter configured to use the network service memory to select, among frames received from the network, service frames related to the network service to be tested, and to communicate selected fields of said frames and related timestamps to the service statistics generation logic.

23. The transceiver of claim 17 wherein the network service to be tested comprises network Layer 3 or Layer 4 service, and wherein the network service memory includes memory fields for storing Layer 3 or Layer 4 network service identifiers.

24. The transceiver of claim 22 comprising a non-volatile memory, wherein the statistics generation logic comprises a fault-proof statistics logic for saving the statistics in the nonvolatile memory.

* * * * *